(12) United States Patent
Carroll et al.

(10) Patent No.: US 8,860,289 B2
(45) Date of Patent: Oct. 14, 2014

(54) LED-BASED LIGHT BULB DEVICE

(71) Applicant: Forever Bulb, LLC, Grantsburg, WI (US)

(72) Inventors: David W. Carroll, Grantsburg, WI (US); Wendell L. Carroll, Minneapolis, MN (US)

(73) Assignee: Forever Bulb, LLC, Grantsburg, WI (US)

( * ) Notice: Subject to any disclaimer, the term of this patent is extended or adjusted under 35 U.S.C. 154(b) by 0 days.

(21) Appl. No.: 13/863,974

(22) Filed: Apr. 16, 2013

(65) Prior Publication Data

US 2013/0301281 A1 Nov. 14, 2013

Related U.S. Application Data

(63) Continuation of application No. 13/226,041, filed on Sep. 6, 2011, now Pat. No. 8,421,322, which is a continuation of application No. 12/435,893, filed on May 5, 2009, now Pat. No. 8,013,501.

(60) Provisional application No. 61/058,637, filed on Jun. 4, 2008.

(51) Int. Cl.
| | |
|---|---|
| H01J 1/02 | (2006.01) |
| H01J 7/24 | (2006.01) |
| H01J 61/52 | (2006.01) |
| H01K 1/58 | (2006.01) |
| B60Q 1/26 | (2006.01) |
| F21V 1/00 | (2006.01) |
| F21V 29/00 | (2006.01) |
| F21K 99/00 | (2010.01) |
| F21V 3/02 | (2006.01) |
| F21Y 111/00 | (2006.01) |
| F21Y 101/02 | (2006.01) |

(52) U.S. Cl.
CPC .............. *F21V 29/22* (2013.01); *F21V 29/242* (2013.01); *F21K 9/135* (2013.01); *F21V 29/244* (2013.01); *F21V 3/02* (2013.01); *F21Y 2111/001* (2013.01); *F21V 29/246* (2013.01); *F21Y 2101/02* (2013.01); *F21V 29/004* (2013.01)
USPC .............................. 313/46; 362/227; 362/235

(58) Field of Classification Search
USPC ..................................... 313/46; 362/227, 235
See application file for complete search history.

(56) References Cited

U.S. PATENT DOCUMENTS

| | | |
|---|---|---|
| 5,162,696 A | 11/1992 | Goodrich |
| 5,806,965 A | 9/1998 | Deese |

(Continued)

FOREIGN PATENT DOCUMENTS

| | | |
|---|---|---|
| DE | 102007056874 | 5/2009 |
| JP | S59-173356 | 11/1984 |

(Continued)

OTHER PUBLICATIONS

Japanese Office Action for related Application No. JP2013-176465 mailed May 13, 2014.

*Primary Examiner* — Anh Mai
*Assistant Examiner* — Zachary J Snyder
(74) *Attorney, Agent, or Firm* — Dicke, Billig & Czaja, PLLC

(57) ABSTRACT

An LED light bulb device including a bulb body, heat sink stems and LEDs. The bulb body defines an exterior and an interior region. The heat sink stems are discrete from one another and extend along the bulb body in a circumferentially spaced fashion. A first LED is directly supported by the first heat sink stem, and a second LED is directly supported by the second heat sink stem. Light from the LEDs is directed inwardly into the interior region and then outwardly from the interior region.

8 Claims, 20 Drawing Sheets

(56) References Cited

U.S. PATENT DOCUMENTS

| | | |
|---|---|---|
| 6,220,722 B1 | 4/2001 | Begemann |
| 6,343,871 B1 | 2/2002 | Yu |
| 6,367,949 B1 | 4/2002 | Pederson |
| 6,409,361 B1 | 6/2002 | Ikeda |
| 6,462,475 B1 | 10/2002 | Lee |
| 6,739,734 B1 | 5/2004 | Hulgan |
| 7,086,756 B2 | 8/2006 | Maxik |
| D529,202 S | 9/2006 | Dagai et al. |
| D531,741 S | 11/2006 | Takahashi |
| D534,665 S | 1/2007 | Egawa et al. |
| D538,953 S | 3/2007 | Mama |
| 7,217,956 B2 | 5/2007 | Daniels et al. |
| 7,259,030 B2 | 8/2007 | Daniels et al. |
| 7,318,661 B2 | 1/2008 | Catalano |
| 7,319,293 B2 | 1/2008 | Maxik |
| D581,066 S | 11/2008 | Van Dyn Hoven |
| D601,278 S | 9/2009 | Takahashi |
| 7,588,351 B2 | 9/2009 | Meyer |
| 7,661,840 B1 | 2/2010 | Eriksson |
| D617,915 S | 6/2010 | Wada et al. |
| 7,726,836 B2 | 6/2010 | Chen |
| 7,736,020 B2 | 6/2010 | Baroky et al. |
| D633,226 S | 2/2011 | Katsaros |
| 2002/0021573 A1 | 2/2002 | Zhang |
| 2002/0176253 A1 | 11/2002 | Lee |
| 2003/0031015 A1 | 2/2003 | Ishibashi |
| 2003/0090910 A1 | 5/2003 | Chen |
| 2003/0117803 A1 | 6/2003 | Chen |
| 2003/0174499 A1 | 9/2003 | Bohlander |
| 2004/0037080 A1 | 2/2004 | Luk et al. |
| 2005/0030761 A1 | 2/2005 | Burgess |
| 2005/0174769 A1 | 8/2005 | Yong et al. |
| 2005/0207152 A1 | 9/2005 | Maxik |
| 2005/0207159 A1 | 9/2005 | Maxik |
| 2006/0012997 A1 | 1/2006 | Catalano et al. |
| 2006/0221606 A1 | 10/2006 | Dowling |
| 2006/0227558 A1 | 10/2006 | Osawa et al. |
| 2006/0285325 A1 | 12/2006 | Ducharme et al. |
| 2006/0291256 A1 | 12/2006 | Cobbler |
| 2007/0103914 A1 | 5/2007 | McCaffrey |
| 2007/0291482 A1 | 12/2007 | Baroky et al. |
| 2008/0024070 A1 | 1/2008 | Catalano et al. |
| 2008/0210953 A1* | 9/2008 | Ladstatter et al. .............. 257/88 |
| 2008/0285279 A1 | 11/2008 | Ng et al. |
| 2009/0086492 A1 | 4/2009 | Meyer |
| 2009/0251882 A1 | 10/2009 | Ratcliffe |
| 2010/0301353 A1 | 12/2010 | Pabst et al. |

FOREIGN PATENT DOCUMENTS

| | | |
|---|---|---|
| JP | 2001243809 | 9/2001 |
| JP | 2002184209 | 6/2002 |
| JP | 2003031005 | 1/2003 |
| JP | 2005310561 | 11/2005 |
| JP | 2006313731 | 11/2006 |
| WO | 2005090852 | 9/2005 |
| WO | 2008047444 | 4/2008 |
| WO | 2009149263 | 12/2009 |

* cited by examiner

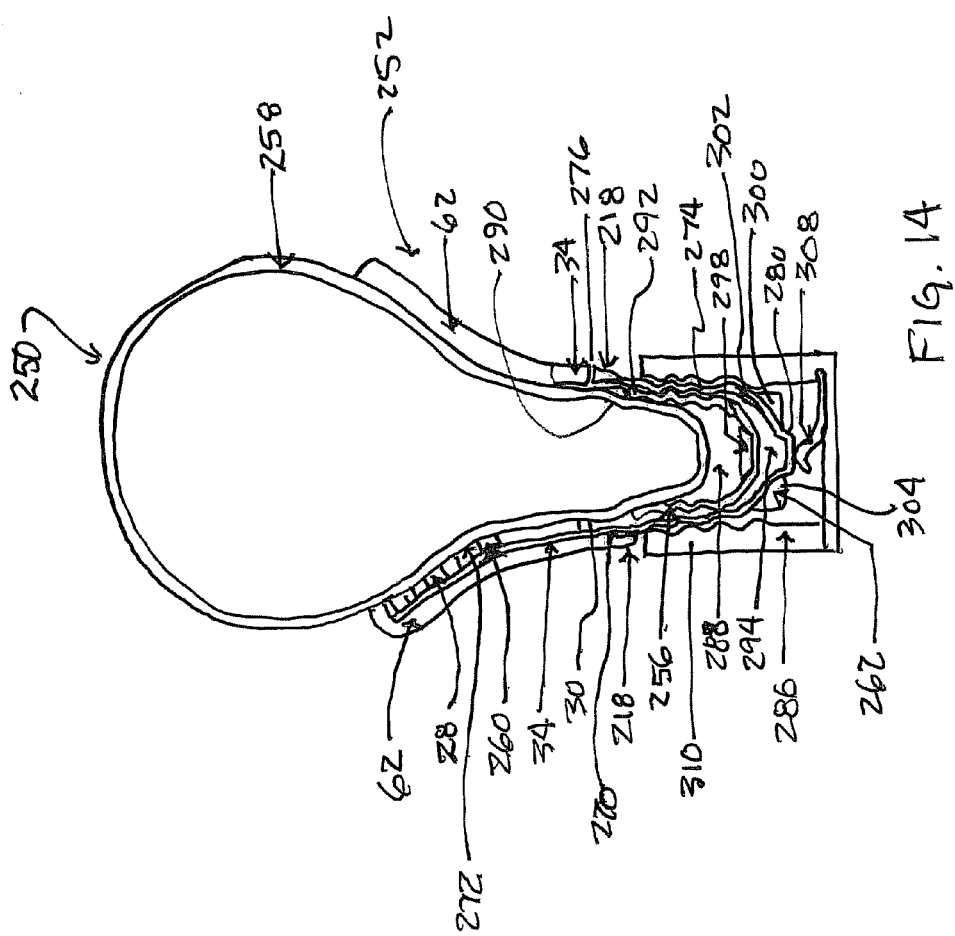

LED-BASED LIGHT BULB DEVICE

CROSS-REFERENCE TO RELATED APPLICATIONS

This application is a continuation of U.S. patent application Ser. No. 13/226,041, filed Sep. 6, 2011, and entitled "LED-Based Light Bulb Device", now U.S. Pat. No. 8,421,322, issued Apr. 16, 2013, which is a continuation of U.S. patent application Ser. No. 12/435,893, filed May 5, 2009, and entitled "LED-Based Light Bulb Device", now U.S. Pat. No. 8,013,501, issued Sep. 6, 2011, and claims priority under 35 U.S.C. §119(e)(1) to U.S. Provisional Patent Application Ser. No. 61/058,637, filed Jun. 4, 2008, entitled "LED Light and Existing Bulb Device"; and the entire teachings each of which are incorporated herein by reference.

BACKGROUND

The present disclosure relates to light emitting diode (LED) illuminating devices and methods, and more specifically to LED-based lighting solutions in the form of a common light bulb.

Incandescent light bulb replacement solutions, such as compact fluorescent lights (CFLs) and LED bulbs, are becoming more widely used as the cost of energy increases. One of the results of this change is an increasing problem with the waste created as the old bulbs are thrown away. This has a negative environmental impact. Further, CFLs have mercury and gas; eventually as users replace these bulbs, qualified disposal is required. Inevitably many users will place CFL bulbs with common trash to be crushed and impacting the environment. Many millions of disposal replacement bulbs of all kinds are increasing and continue to create an ongoing and difficult problem to monitor and correct.

Regardless of format, conventional light bulbs include a glass (or other transparent or semi-transparent material) enclosure and an end cap or plug (for threaded interface with a standard light socket). These components add to the cost of goods. Further, the glass and end cap in replacement bulbs are also bulky. The glass and socket must be protected from breakage, which negatively impacts the cost of packaging materials and shipping space. Because many suppliers are overseas, this increases the impact per unit due to cost of shipping differences. The bulk is also problematic for retail sales store displays. All this adds to the price of the product further depressing the consumer and business potential buyer from the natural desire to do what is right for the environment and energy efficiency.

Esthetic concerns exist for the twisty tubes of the CFL and unusual shapes of current LED environmental solutions. Consumers as commercial concerns have pre-existing fixtures in many cases that look unappealing with these new replacement bulb offerings. In many cases, consumers avoid doing what is environmentally and financially correct to maintain the esthetical look of the long-lived shape and look of the incandescent bulb.

LED-based lights provide the longest lasting, over-time the lowest cost, and the most environmentally friendly solution for lighting. However, a major problem is the initial high-cost per lumen and the directional nature of the light dispersion method.

In view of the above, a solution to address these problems is needed. The solution ideally will encourage the desired environmental replacement values.

SUMMARY

Some aspects in accordance with principles of the present disclosure relate to an LED light bulb device including a bulb body, heat sink stems and LEDs. The bulb body defines an exterior and an interior region. The heat sink stems are discrete from one another and extend along the bulb body in a circumferentially spaced fashion. A first LED is directly supported by the first heat sink stem, and a second LED is directly supported by the second heat sink stem. Light from the LEDs is directed inwardly into the interior region and then outwardly from the interior region.

BRIEF DESCRIPTION OF THE DRAWINGS

FIG. 14 is a cross-section view of the device of FIG. 12 mounted to a light socket;

DETAILED DESCRIPTION

Figure 1:
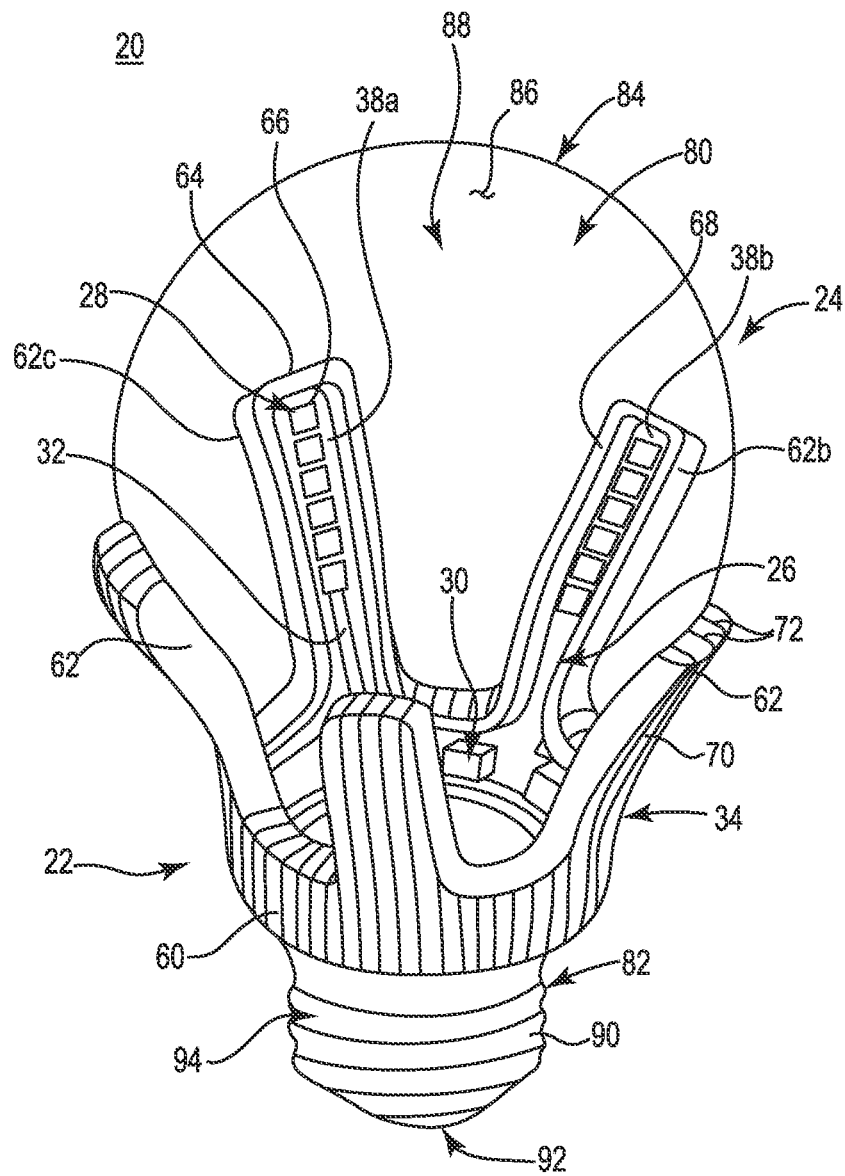
FIG. 1 is a perspective view of an LED light bulb device in accordance with principles of the present disclosure.

One embodiment of an LED light bulb device 20 in accordance with aspects of the present disclosure is shown in FIG. 1. The device 20 includes an LED assembly 22 (referenced generally) and a light bulb-like structure 24. Details on the various components are provided below. In general terms, however, the LED assembly 22 is mounted to the light bulb-like structure 24, with the resultant LED light device 20 emitting light when connected to, and energized by, a standard light bulb socket.

The LED assembly 22 includes, in some embodiments, a substrate 26, a plurality of light emitting diode lights ("LEDs") 28, transformer circuitry 30, connective circuitry 32 (referenced generally), and an optional heat sink body 34. The substrate 26 optionally maintains the LEDs 28, the transformer circuitry 30, and the connective circuitry 32 in a manner facilitating desired arrangement of the components 28-32 relative to the light bulb-like structure 24, as well as establishing an electrical pathway for powering of the LEDs 28. The heat sink body 34, where provided, serves to dissipate heat from the LEDs 28 and optionally the transformer circuitry 30, and can more robustly mount the LED assembly 22 to the light bulb-like structure 24.

Figure 2:
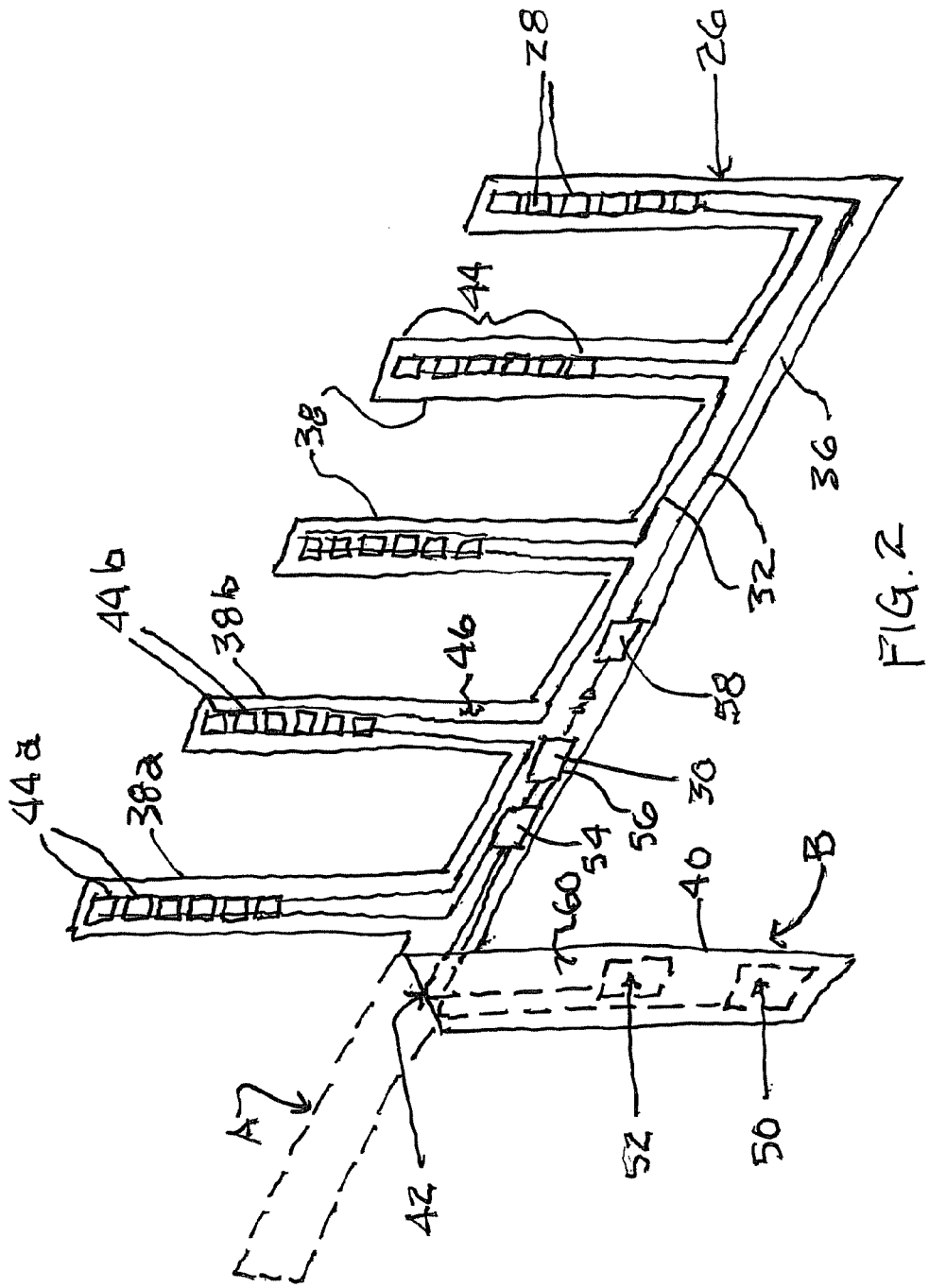
FIG. 2 is a simplified perspective view of a flex circuit useful with the device of FIG. 1.

One acceptable configuration of the substrate 26, the LEDs 28, the transformer circuitry 30 and the connective circuitry 32 prior to mounting to the light bulb-like structure 24 is provided in FIG. 2. In some constructions, the substrate 26 is a flexible, non-conductive material, and combines with the connective circuitry 32 to form a flex circuit as known in the art. Alternatively, a more rigid material can be employed for some or all of the substrate 26 (e.g., the LEDs 28 can be maintained by a flexible substrate, whereas the transformer circuitry 30 and portions of the connective circuitry 32 are formed as part of a rigid, printed circuit board). Regardless, the conductive circuitry 32 electrically interconnecting the LEDs 28 with the power transformer circuitry 30 (illustrated generally).

In some embodiments the substrate 26 provides or forms various segments at which the components 28-32 are maintained, for example a base 36, a plurality of legs 38, and a tail 40. The legs 38 extend from the base 36 in a spaced apart fashion (i.e., the first leg 38a is spaced from the second leg 38b in common extension from the base 36) and, as described below, each of the legs 38 maintains a set of the LEDs 28. The tail 40 extends from the base 36 and is foldable relative to the base 36 (e.g., along an imparted fold line 42). Where provided, the fold line 42 enhances the ease of final assembly to the light bulb-like structure 24; however, where the substrate 26 is initially formed to a shape corresponding with corresponding shapes of the light bulb-like structure 24, no folding may be necessary. The pre-folded state of the tail 40 is shown with dashed lines (identified as "A") in FIG. 2, whereas the folded state is labeled as "B".

The base 36 can assume a variety of shapes and/or sizes appropriate for desired positioning of the legs 38 (and thus the maintained LEDs 28) relative to the light bulb-like structure 24 (FIG. 1). In some embodiments, a length of the base 36 is commensurate with a circumference of the threaded cap of a standard AC or Edison light bulb. Further, the base 36 is sufficiently sized for mounting of the selected transformer circuitry 30.

The legs 38 can have a variety of different sizes and/or shapes differing from those shown in FIG. 2. Similarly, while each of the legs 38 are shown as extending from the base 36 in an identical orientation, in other embodiments, the legs 38 need not be identically disposed (e.g., one or more of the legs 38 can be disposed at a non-perpendicular angle relative to the base 36). Further, while FIG. 2 illustrates the substrate 26 as including five of the legs 38, any other number, greater or lesser, is also acceptable. In more general terms, then, the legs 38 each maintain a set 44 of LEDs 28, with the LEDs 28 being located in close proximity to one another (relative to the corresponding leg 38) along a first major surface 46 of the substrate 26. For example, the first leg 38a maintains the first set 44a of LEDs 28, the second leg 38b maintains the second set 44b of LEDs 28, etc. Although FIG. 2 depicts each of the sets 44 as including six LEDs 28, any other number, either greater or lesser, is also acceptable. Further, the number of the LEDs 28 in each of the sets 44 need not be identical. However, it has surprisingly been found that providing the LED assembly 22 with a total of thirty of the LEDs 28 provides acceptable light intensity while sufficiently powering the LEDs 28 via a conventional 120 volt AC power source.

The power transformer circuitry 30 can assume a wide variety of forms appropriate for converting AC energy (e.g., 120 volt) to DC energy appropriate for energizing the LEDs 28; or, where the LEDs 28 are configured to operated based on an AC power input, the transformer circuitry 30 can incorporate components configured to transform a provided AC power supply to an AC power format appropriate for powering the LEDs 28. For example, in some embodiments, the power transformer circuitry 30 includes a positive terminal pad 50, a neutral (or negative) terminal pad 52, a resistor 54, a current controller 56, and a bridge rectifier 58. While the resistor 54, the current controller 56, and/or the bridge rectifier 58 (or other power transforming chip set) can be encapsulated by the substrate, the terminal pads 50, 52 are exteriorly exposed, and thus available for electrically interfacing with a source of AC power, such as a standard AC light socket. More particularly, the terminal pads 50, 52 are located along the tail 40 at a spacing described in greater detail below, and are exteriorly exposed relative to the first major surface 46 of the substrate 26. As a point of reference, in the folded state (B) of the tail 40 in FIG. 2, the terminal pads 50, 52 are effectively "hidden" by the tail 40 (such that a second major surface 60 of the substrate 26 is visible in FIG. 2 at the tail 40).

Figure 3:
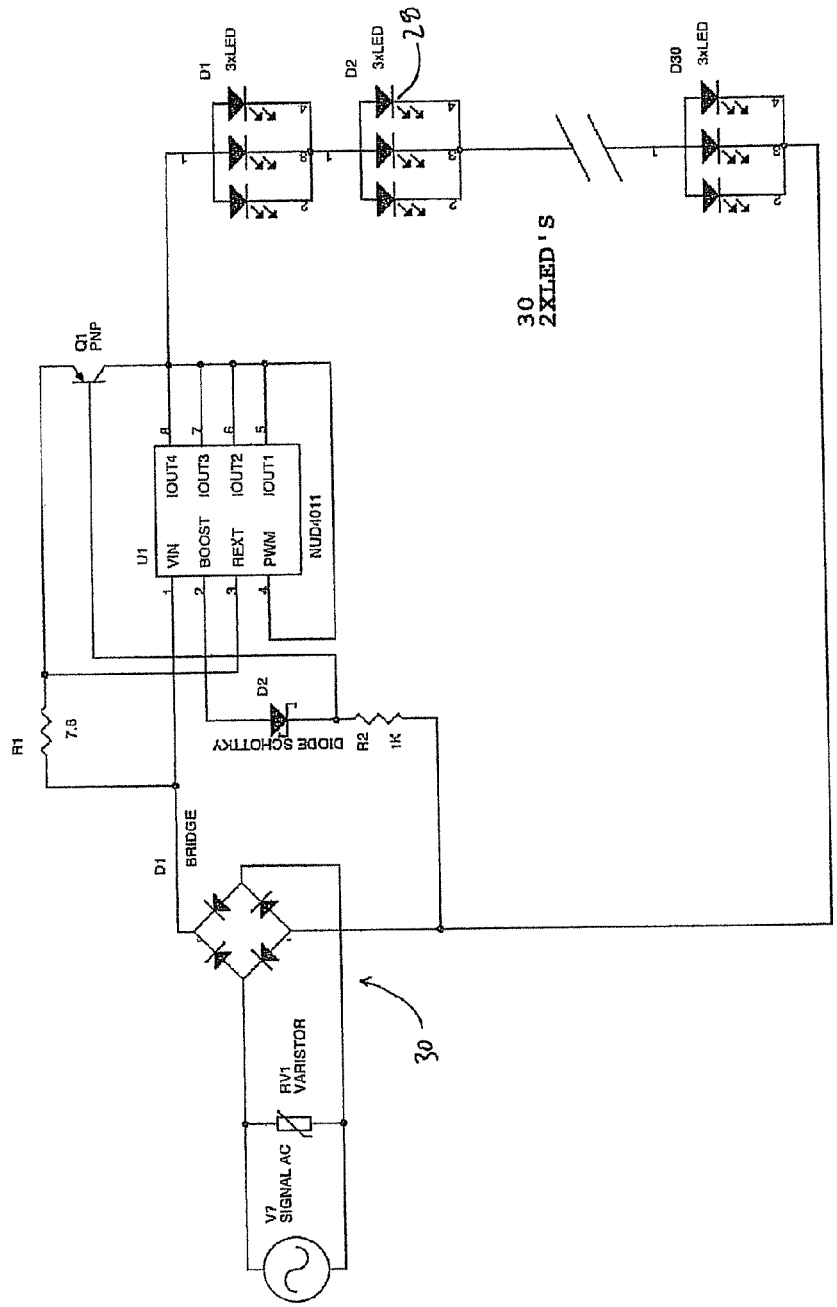
FIG. 3 is a electrical schematic diagram of circuitry useful with the device of FIG. 1.

The power transformer circuitry 30 can include electronic component(s) apart from those illustrated and appropriate for powering the LEDs 28 based on an AC power supply. With this in mind, FIG. 3 provides one example circuitry diagram of the power transformer circuit 30 in powering thirty of the LEDs 28. Other transformer-related components are also envisioned (e.g., a transistor). In other embodiments, the LED assembly 22 can have a greater or lesser number of the LEDs 28.

The LEDs 28 can assume a variety of forms known in the art and conventionally employed for light emitting diodes. The LEDs 28 can alternatively be organic light emitting diodes (OLEDs), quantum dots, or nanocrystals as a coating or layering of the LED for enhancing the light emitted by the LEDs 28 or even as the LEDs 28 themselves. The LEDs 28 can be formed or assembled to the substrate 26 in various fashions, including standard packaging, die-on-flex packaging, wafer layering with spatter coating that permits, for example, non-sapphire based LEDs, etc.

Returning to FIG. 1, the optional heat sink body 34 is configured to encase and protect the legs 38 (and thus the corresponding LEDs 28), as well as the transformer circuitry 30 in some embodiments. The heat sink body 34 dissipates heat generated by the components 28 and/or 30, and is thus formed of an appropriate heat sink material (e.g., molded plastic, ceramic, metal, etc.). Finally, the heat sink body 34 promotes mounting of the LED assembly 22 to the light bulb-like structure 24. With this in mind, in some embodiments, the heat sink body 34 includes or forms a hub 60 and a plurality of stems 62. In general terms, the hub 60 is sized in accordance with a size and shape of a corresponding component of the light bulb-like structure 24 as described below, and encircles the base 36 of the substrate 26. The stems 62 extend from the hub 60, and are sized and shaped in accordance with the legs 38. Thus, the number of stems 62 corresponds with the number of legs 38, and vice-versa. As shown in FIG. 1, then, the first stem 62a corresponds with the first leg 38a, the second stem 62b corresponds with the second leg 38b, etc.

In some constructions, the stems 62 have a length greater than a length of the corresponding legs 38 to more fully encompass the legs 38. For example, the first stem 62a terminates at an end 64 that is located longitudinally beyond a leading end 66 of the corresponding leg 38a upon final assembly. Regardless, an inner surface 68 of the heat sink body 34 can be smooth, and is optionally coated with an adhesive (or an adhesive tape can be applied) to promote more rigid engagement with the light bulb-like structure 24 as described below. Conversely, an outer surface 70 of the heat sink body 34 can form fins 72 that promote heat dissipation. Alternatively, the heat sink body 34 can have other features not shown, and in some embodiments, can be eliminated.

The substrate 26 (and the corresponding components 28-32 maintained thereby) can be assembled to the heat sink body 34 in a variety of fashions, as described below. For example, the substrate 26 can be embedded into the heat sink body 34, the heat sink body 34 assembled over the substrate 26 following mounting of the substrate 26 to the light bulb-like structure 24, etc.

The LED assembly 22 can be employed with a variety of different light bulb-like structures 24. In general terms, the light bulb-like structure 24 is akin to a "standard" or known AC bulb (e.g., an Edison light bulb), and includes a bulb body 80 and a cap 82. The bulb body 80 can be formed of glass, plastic, etc., and includes a wall 84 defining an exterior surface 86 and a hollow, interior region 88 (referenced generally in FIG. 1). The bulb body 80 can have various shapes and sizes (e.g., rounded globe, pyramidal (flood light), candle-shaped, etc.), and can be conventionally coated with a light diffusing material (e.g., "soft" white light). The cap 82 is affixed to the bulb body 80, and can form a threaded exterior surface 90 for threadably engaging a standard AC light socket in selectively mounting the LED light device 20 to the AC light socket as is known in the art. Along these same lines, the cap 82 is optionally formed of a conductive material (e.g., metal) as is typically employed with conventional light bulbs, and forms a positive contact surface 92 that is electrically isolated from a neutral contact surface 94 (referenced generally).

With the above explanation of the light bulb-like structure 24 in mind, in some constructions, the light bulb-like structure 24 need not include any additional components typically found with conventional AC/Edison light bulbs. Thus, for example, the light bulb-like structure 24 does not include a filament, but otherwise has the external appearance of a typical light bulb. In other embodiments, however, the light bulb-light structure 24 is an already existing AC or Edison light bulb to which the LED assembly 22 is mounted, and can thus include a filament (and other conventional light bulb features). With these alternative constructions, the filament may or may not be functional (e.g., the LED assembly 22 can be mounted to an existing, but non-functional light bulb, to an existing and functional light bulb, etc.).

Figure 4:
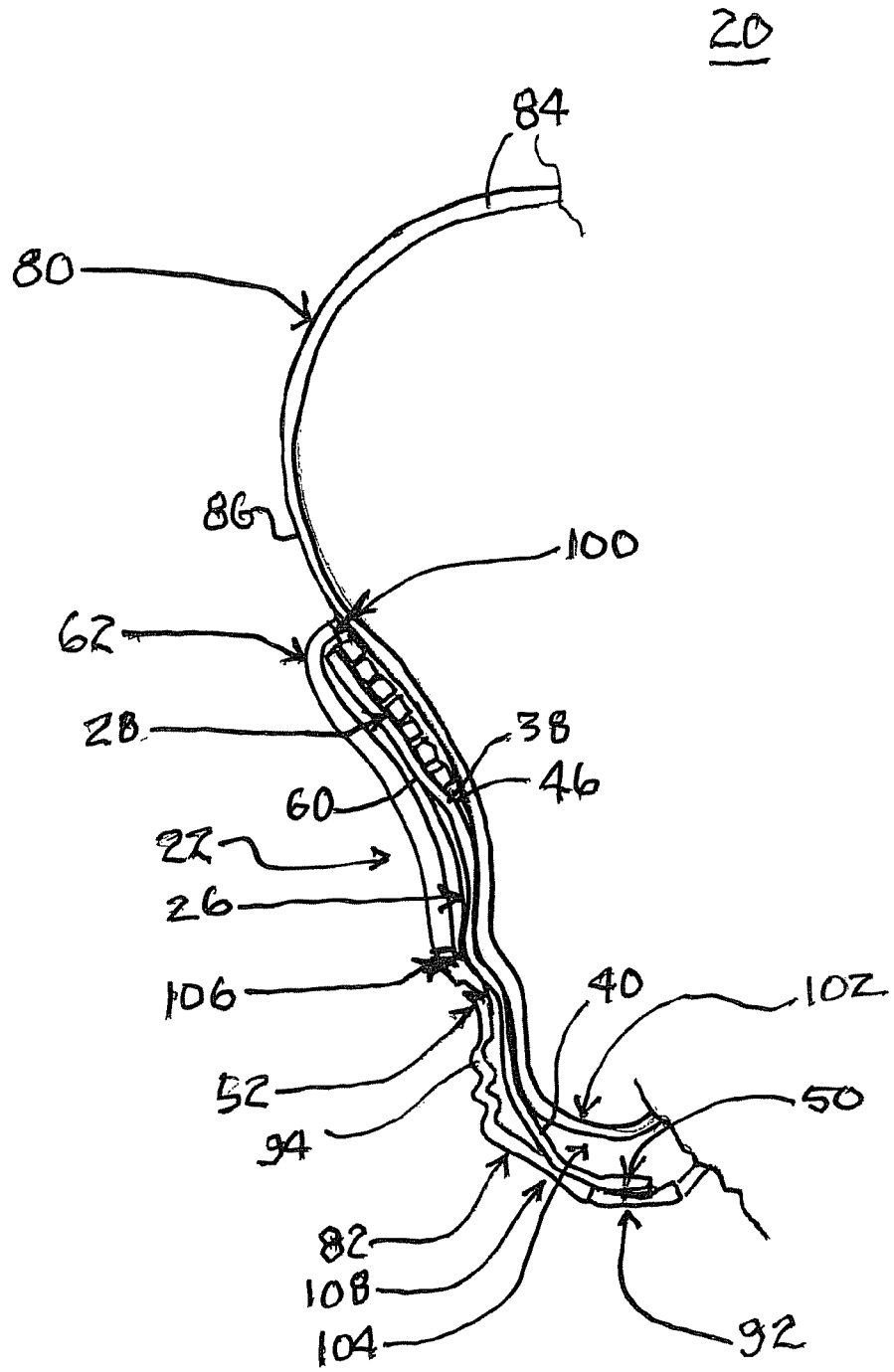
FIG. 4 is a partial cross-sectional view of the device of FIG. 1.

Regardless of an exact configuration of the light bulb-like structure 24, the LED assembly 22 is mounted to the light bulb-like structure 24 as shown. The legs 38 extend along the bulb body 80, locating the corresponding LEDs 28 immediately adjacent or against the exterior surface 86. Thus, the LEDs 28 are positioned to direct emitted light into the interior region 88 (i.e., the LEDs 28 are arranged to be inwardly facing). The stems 62 are disposed over the corresponding legs 38, extending immediately adjacent the LEDs 28 carried thereby. As best shown in FIG. 4, for example, the first major surface 46 of the substrate 26 (at least along the leg 38 illustrated in FIG. 4) faces the exterior surface 86 of the bulb body 80, such that the LEDs 28 are sandwiched between the substrate 26 and the bulb body wall 84. The heat sink body stem 62 extends along the second major surface 60 of the substrate leg 38 directly opposite the LEDs 28, such that heat generated by operation of the LEDs 28 is transferred to the heat sink stem 62 and readily dissipated (for example, via the fins 72). The stem 62 can be more robustly bonded to the bulb body wall 84 by a high temperature stable adhesive and/or sealant (referenced generally at 100), and secures the substrate leg 38 (and thus the LEDs 28) to the location shown. With this configuration, then, the stems 62 serve to protect the LEDs 28 from external contaminants (e.g., dust), with the LEDs 28 effectively being sealed between the bulb body wall 84 and the corresponding stem 62.

As further reflected in FIG. 4, extension of the substrate 26 from the leg 38 projects between the bulb body 80 and the cap 82. As a point of reference, with conventional light bulb manufacturing techniques, the bulb body 80 forms a foot 102 that is received within, and bonded to, the cap 82 via an adhesive 104 (referenced generally), for example. An electrically non-conductive spacer 106 can optionally be included with the LED assembly 22 that electrically isolates the heat sink body 34 from the cap 82. Regardless, the tail 40 is depicted as extending between the bulb body 80 and the cap 82, with the neutral terminal pad 52 being electrically connected to the cap neutral surface 94, and the positive terminal pad 50 being electrically connected to the cap positive surface 92. In this regard, an electrically conductive adhesive can be employed to ensure long term electrical connection between the pads 50, 52 and the surfaces 92, 94, respectively. Finally, an optional manufacturer identification marker 108 can be formed or imprinted on to the cap 82.

Figure 5:
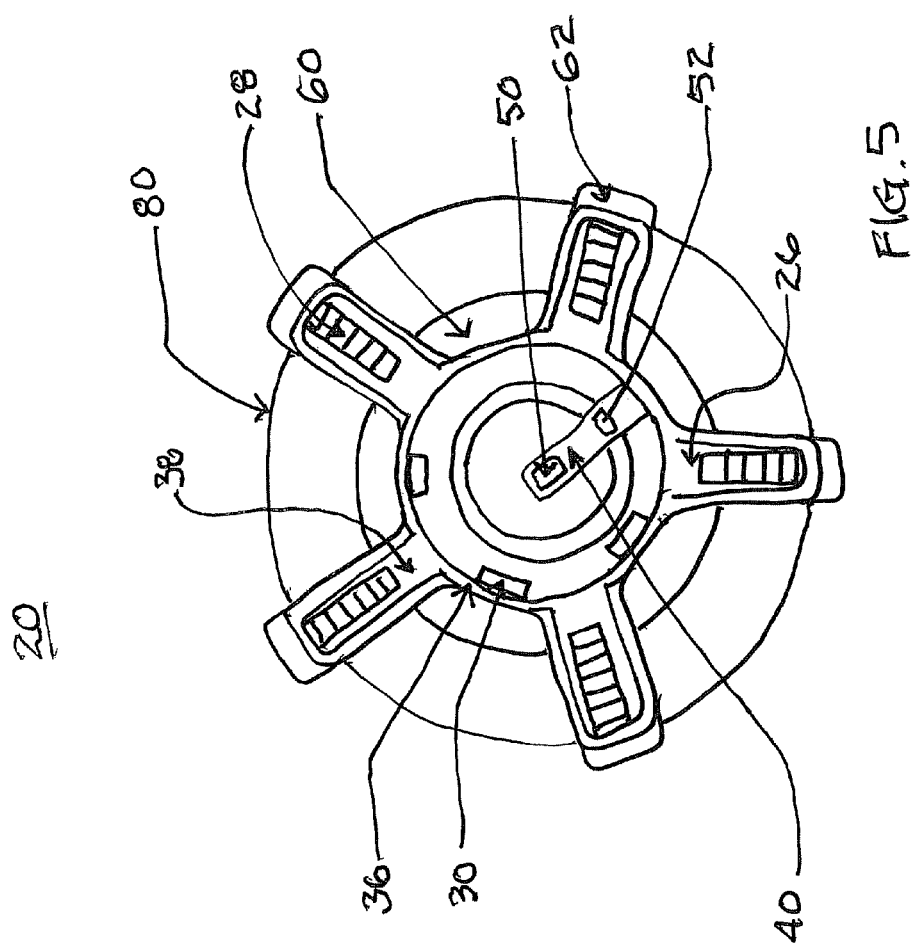
FIG. 5 is a top view of the device of FIG. 1.

Placement of the pads 50, 52 at an interior of the cap 82 is further reflected in FIG. 5. In addition, the base 36 of the substrate 26 is shown as encircling the foot 102 of the bulb body 80, locating the transformer circuitry 30 against the exterior surface 86 (FIG. 4). The heat sink hub 60 encases the base 36, and is thus in close proximity to the transformer circuitry 30 for readily dissipating heat generated by operation thereof.

With reference to FIGS. 1 and 4, upon final assembly, the LED light bulb device 20 can be connected to a conventional AC light bulb socket in a manner readily understood by virtually any end-user; the cap 82 is simply screwed into the socket. Because the positive and neutral terminal pads 50, 52 are located or otherwise electrically connected to the corresponding positive and neutral contact surfaces of the cap 82, as the cap 82 is threaded to the AC light bulb socket, the terminal pads 50, 52 are brought into electrical connection with the positive and neutral wirings carried by the light bulb socket. When the light socket is energized, the transformer circuitry 30 transforms the AC power supply to DC power in some embodiments, and the connective circuitry delivers the DC power to the LEDs 28. In response, the LEDs generate and emit light. In this regard, light emitted from the LEDs 28 is first directed inwardly through the bulb body wall 84 and into the interior region 88; consistent with light wave properties, the so-directed light is then directed outwardly from the interior region 88 and through the bulb body wall 84 to illuminate the external environment surrounding the LED light device 20. Effectively, then, light from the LEDs 28 is subjected to a double diffusion process (via the diffusive coating conventionally applied to light bulbs), thereby "softening" the light ultimately delivered to the surrounding environment. This double diffusion effect can serve to lessen the likelihood that a user of the LED light device 20 will perceive the so-generated light as being too intense, a concern that is otherwise common to prior LED-based lighting devices. Regardless, the heat sink body 34 dissipates heat from the LEDs 28 and/or the transformer circuitry 30, better ensuring long-term operation of the LED light bulb device 20. With the embodiment of FIG. 1, as well as many of the additional embodiments described below, opposing pairs of the legs 38 are arranged to position the corresponding LEDs 28 at opposing sides of the bulb body 80. Alternatively, other arrangements are contemplated and are acceptable.

The LED light bulb device 20 can be provided to an end user in a pre-assembled form (i.e., the LED assembly 22 is mounted or affixed the light bulb-light structure 24 by the manufacturer). With this approach, some manufacturing techniques can include the retro-fitting of an existing, high speed AC/Edison bulb manufacturing line to incorporate the LED assembly 22 (and mounting thereof) as described above. Because the filament and other components of conventional AC/Edison light bulbs (apart from the bulb body 80 and the cap 82) are not necessary, the corresponding manufacturing steps and parts can be eliminated from the existing manufacturing line, thereby saving costs. Alternatively, and as described in greater detail below, the LED assembly 22 can be provided to an end user as a standalone item, with the user mounting the LED assembly 22 to a separately provided light bulb-like structure 24 (e.g., non-functioning light bulb or a functional light bulb). The resultant LED light bulb device 20 can thus be easily constructed for replacement of the otherwise defective light bulb. Where the LED assembly 22 is mounted (e.g., by an end user) to an existing AC/Edison light bulb, the LED assembly 22 incorporates various features that disable electrical connection between the cap 82 and other components (e.g., the filament).

Figure 6:
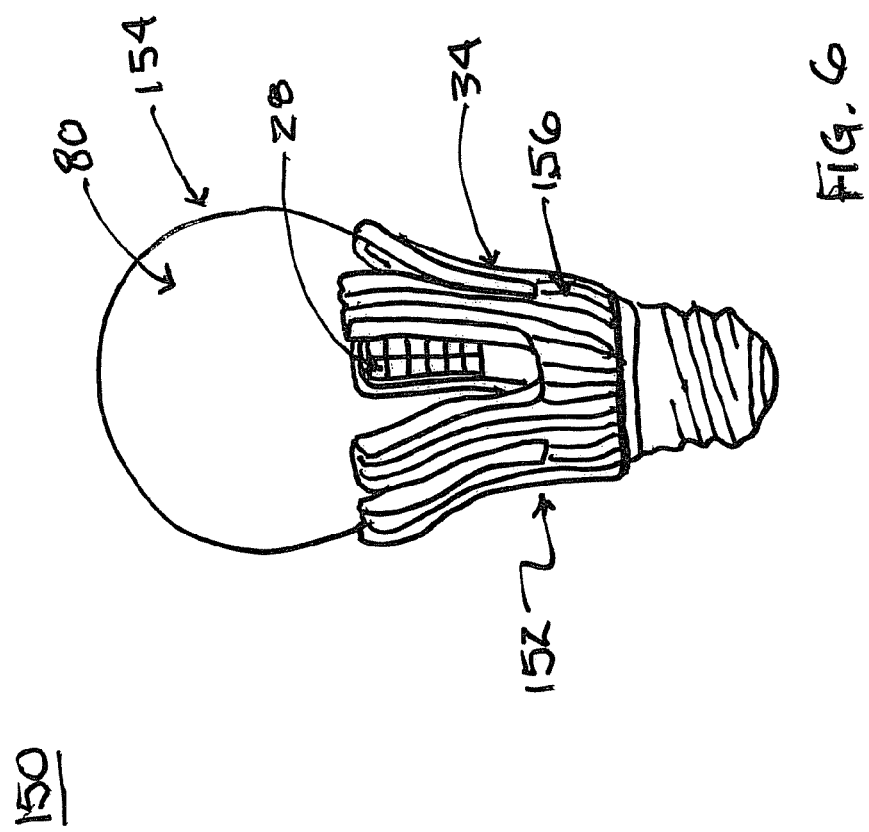
FIG. 6 is a side view of another LED light bulb device in accordance with principles of the present disclosure.

Another embodiment of an LED light bulb device 150 in accordance with aspects of the present disclosure is shown in FIG. 6. The LED light bulb device 150 is akin to the LED light device 20 (FIG. 1) described above, and includes an LED assembly 152 and a light bulb-like structure 154. The LED assembly 152 incorporates the components described above, such as the LEDs 28 and the heat sink body 34, as well as other components that are hidden in the view of FIG. 6 (e.g., substrate, transformer circuitry and connective circuitry as described above). The light bulb-light structure 154 is also similar to the light bulb-light structure 24 described above, and includes the bulb body 80. With the embodiment of FIG. 6, however, the LED assembly 152 is an integrally formed component that includes various components, including a component that is otherwise akin to the cap 82 (FIG. 1) of a conventional AC/Edison light bulb.

Figure 7:
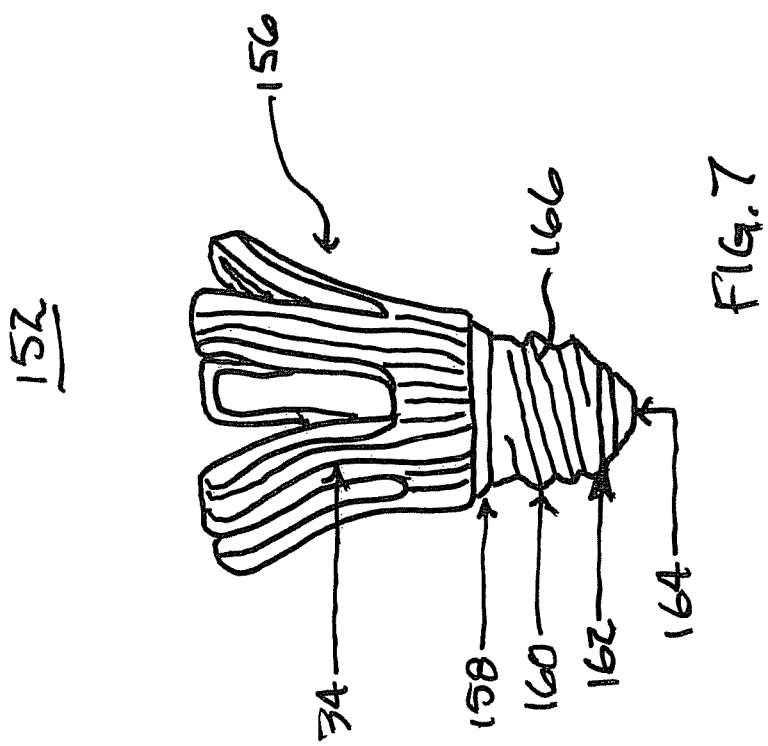
FIG. 7 is a side view of a portion of the device of FIG. 6, included a formed part.

In particular, and as shown in isolation in FIG. 7, the LED assembly 152 includes a formed part 156 that includes the heat sink body 34, a separator ring 158, a cap 160, an isolator ring 162 and a positive contact surface 164. The heat sink body 34 again can include the hub 60 and the stems 62. The separator ring 158 electrically isolates the heat sink body 34 from the cap 160 (and in particular a neutral contact surface formed thereby). The cap 160, in turn, is akin to a conventional AC/Edison light bulb cap, forming an exteriorly threaded surface 166. The isolator ring 162 electrically isolates the cap 160 (and in particular the neutral contact surface) from the positive contact surface 164.

The formed part 156 can be manufactured by a single molded or formed method in which the two non-conductive inserts (i.e., the separator ring 158 and the isolator ring 162) are placed into the corresponding mold prior to injection. An electrically conductive material is then injected into the mold to form three sprues around the two inserts 158, 162, thereby forming the heat sink body 34, the cap 160 and the positive contact surface 164. Though not shown in FIGS. 6 and 7, the remaining components of the LED assembly 152 (i.e., the substrate and connective circuitry as a flex circuit carrying the transformer circuitry and the LEDs 28) are attached to the formed part 156 (e.g., via a heat conductive adhesive), with the positive terminal pad electrically connected to the positive contact surface 164 and the negative terminal pad electrically connected to the negative contact surface of the cap 160.

Figure 8:
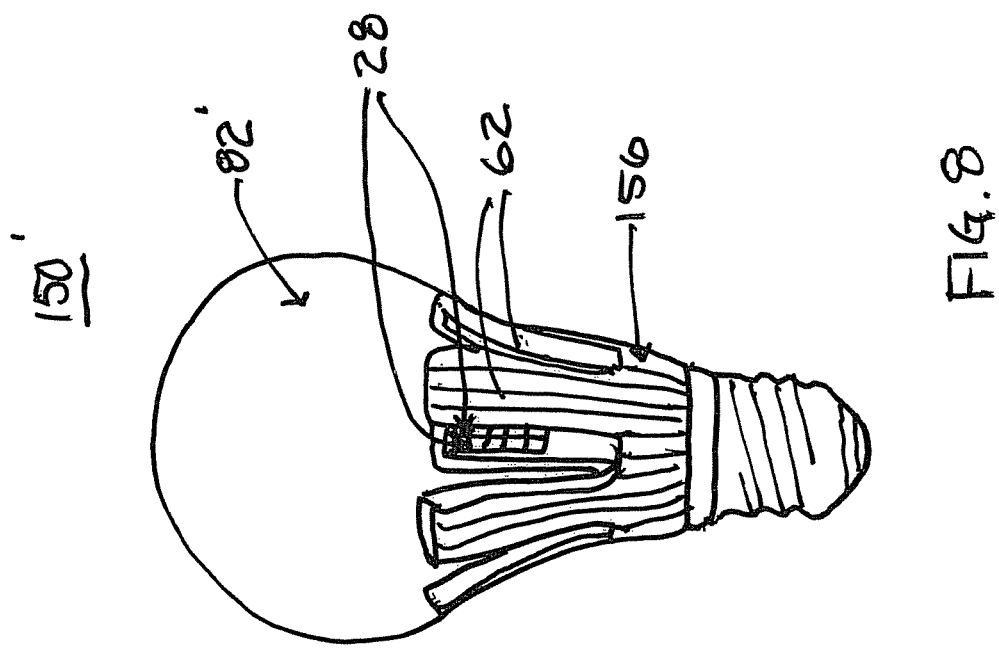
FIG. 8 is a side view of another LED light bulb device in accordance with principles of the present disclosure.

The bulb body 80 is then mounted to the LED assembly 152, for example by inserting the bulb body 80 into the formed part 156, resulting in the arrangement of FIG. 6. During use, the LED light bulb device 150 is connected to a conventional AC light socket as described above, with the LEDs 28 emitting light inwardly into the bulb body 80 resulting in the double diffusion effect. In a related embodiment LED light bulb device 150' shown in FIG. 8, a bulb body 80' can be molded or otherwise assembled more directly to the stems 62 of the formed part 156 (e.g., the stems 62 are nested into the bulb body 80'), providing a more streamlined appearance.

Figure 9:
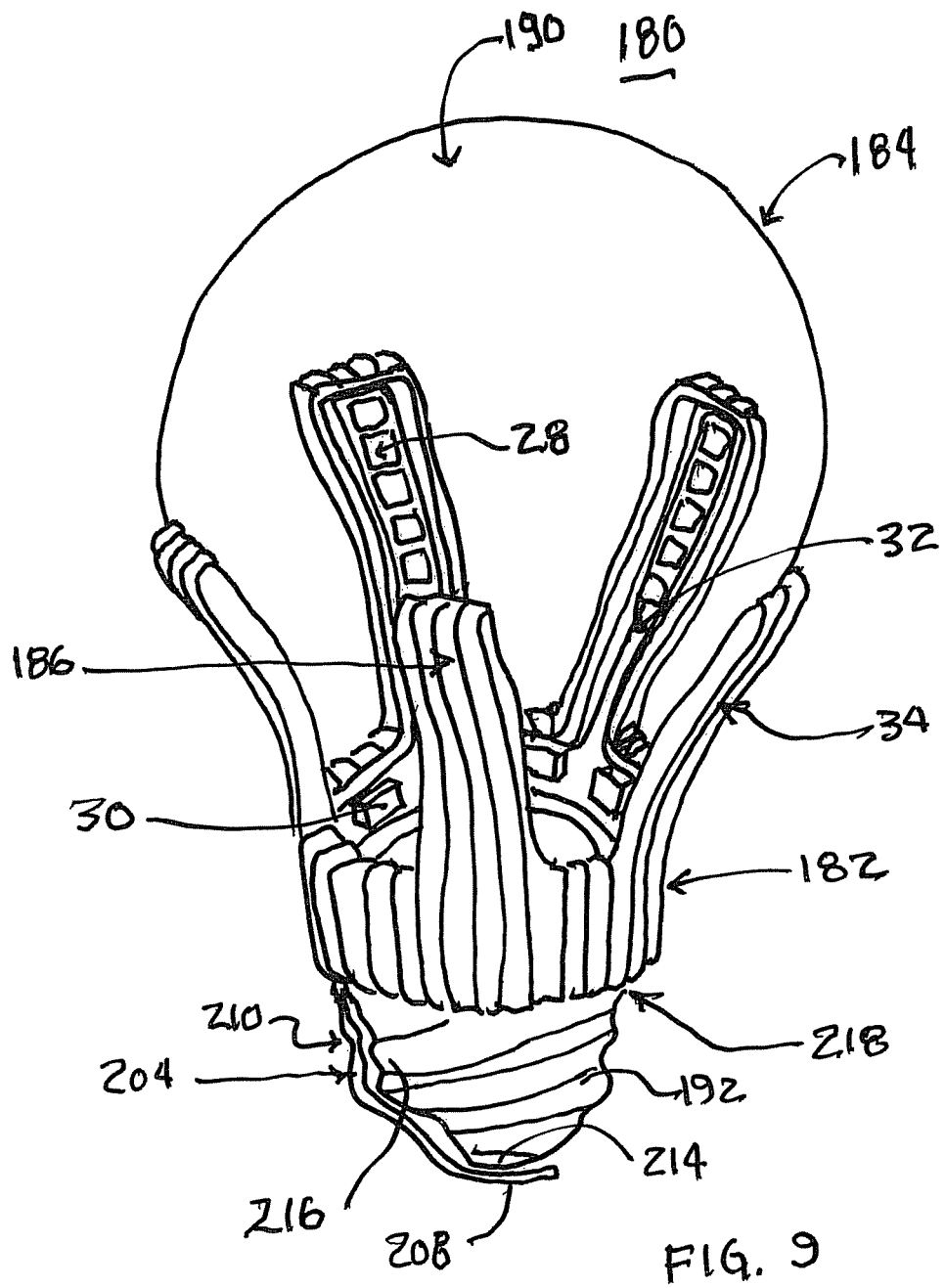
FIG. 9 is a perspective view of another LED light bulb device in accordance with principles of the present disclosure.

Yet another embodiment LED light bulb device 180 is shown in FIG. 9, and again includes an LED assembly 182 and a light bulb-like structure 184. The LED light bulb device 180 is akin to the LED light bulb device 20 (FIG. 1) described above, with the LED assembly 182 including a substrate 186 (e.g., a flexible substrate), the LEDs 28, the transformer circuitry 30, the connective circuitry 32 (not shown), and the optional heat sink body 34. The light bulb-like structure 184 can also be similar to the light bulb-like structure 24 (FIG. 1) described above, and includes a bulb body 190 and a cap 192. Once again, the LED assembly 182 is mounted to the light bulb-like structure 184, with the LEDs 28 being positioned to emit light inwardly toward the bulb body 190 when powered. Unlike previous embodiments, however, the substrate 186 is arranged to extend along an exterior of the cap 192, such that the LED light bulb device 180 can more readily be assembled by the end user.

Figure 10:
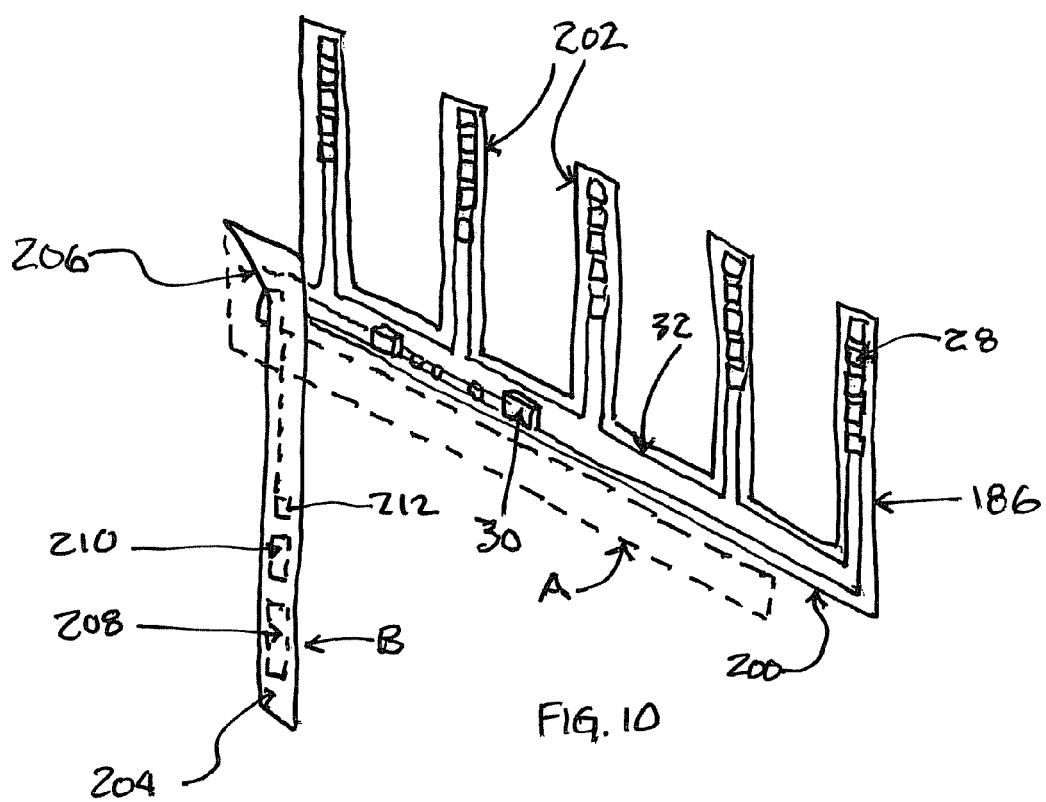
FIG. 10 is a perspective view of a flex circuit useful with the device of FIG. 9.

One construction of the substrate 186 (as well as the LEDs 28 and circuitry 30, 32) is shown in an initial state (e.g., prior to mounting to the light bulb-like structure 184) in FIG. 10. In some embodiments, the substrate 186 and the connective circuitry 32 is formed or provided as a flex circuit to which the LEDs 28 and the transformer circuitry 30 are mounted or formed. Regardless, the substrate forms or defines a base 200, a plurality of legs 202, and a tail 204. The legs 202 extend from the base 200 in a spaced apart fashion, with the LEDs 28 being disposed on each of the legs 202 in a set format as described above. The tail 204 extends from the base 200 apart from the legs 202, and is foldable relative thereto, for example along one or more fold lines 206 imparted into the substrate 186. As a point of reference, FIG. 10 depicts an initial, unfolded state of the tail 204 with dashed lines ("A" in FIG. 10), whereas the folded state is labeled as "B". The transformer circuitry 30 extends along the tail 204, terminating at a positive terminal pad 208 and a neutral terminal pad 210 (with the pads 208, 210 being electrically isolated from one another via the non-conductive substrate 186). It is further contemplated that one or all of the components of the transformer circuitry (e.g., chip sets apart from wiring of the transformer circuitry) can be applied to the tail 204, as indicated at 212 in FIG. 10.

Returning to FIG. 9, the substrate 186, including the components carried thereby, can be mounted to the heat sink body 34 (where provided) in any of the manners described above, prior to mounting of the LED assembly 182 to the light bulb-like structure 184. Alternatively, the substrate 186, including the components carried thereby, can initially be mounted to the light bulb-like structure 184, followed by placement of the heat sink body 34 over the so-mounted substrate 186. Regardless, the base 200 extends about the bulb body 190 (e.g., about the foot 102 as shown in FIG. 4), with the legs 202 extending upwardly along an exterior of the bulb body 190 to position the LEDs 28 as shown. The tail 204 is folded to extend downwardly from the base 200, and extended along an exterior of the cap 192, with the positive terminal pad 208 electrically connected to a positive contact surface 214 of the cap 192, and the neutral terminal pad 210 electrically connected to neutral contact surface 216 of the cap 192 (via, for example, an electrically conductive adhesive). Due to the flexible nature of the substrate 186, the tail 204 readily conforms to a surface of the cap 192 (e.g., any exterior threads). An electrically non-conductive ring 218 is applied over the cap 192, and positioned to electrically isolate the cap 192 from the heat sink body 34 (it being understood that in some embodiments, the non-conductive ring 218 is formed as an integral component of the heat sink body 34). By forming the tail 204 to be of a size greater than a size of the positive contact surface 214 of the cap 192, upon final placement of the LED assembly 182, the tail 204 serves to electrically isolate or disable the cap 192, thereby preventing delivery of power to the cap 192 (and thus any other components, such as a filament (not shown) connected thereto).

Figure 11:
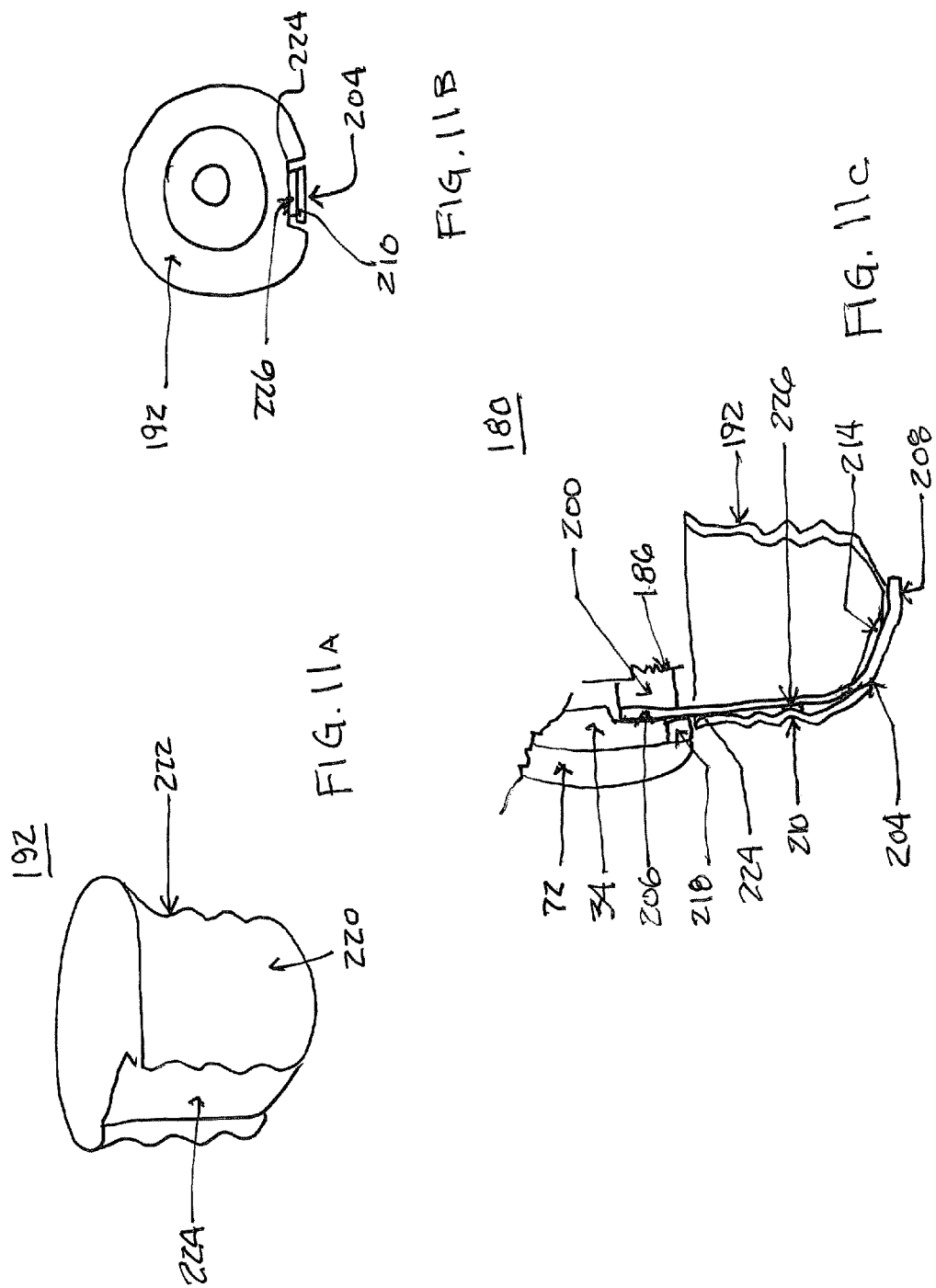
FIG. 11A is a perspective view of a cap useful with the device of FIG. 9.
FIG. 11B is a top view of the cap of FIG. 11A with a portion of the flex circuit of FIG. 10 mounted thereto.
FIG. 11C is a cross-sectional view of a portion of the device of FIG. 9.

While the cap 192 can be of a conventional design (e.g., the light bulb-like structure 184 can be a conventional light bulb), in some embodiments, the cap 192 is formatted to more readily facilitate assembly of the tail 204 thereto. For example, as shown in FIG. 11A, the cap 192 can include a housing 220 forming an exteriorly threaded surface 222 and a channel 224. As described below, the channel 224 is sized and shaped to receive the tail 204 (FIG. 10) such that a thickness thereof does not project beyond the threaded surface 222. More particularly, and as shown in FIG. 11B, the tail 204 is extended through and along the channel 224 upon final assembly. To better ensure that the neutral terminal pad 210 carried by the tail 204 is brought into electrical contact with the light socket (not shown) during use, the substrate 186 can include a material bump or protrusion 226 opposite the neutral terminal pad 210 (or the bump 226 can be formed by the cap 192 within the channel 224). Alternatively, the neutral terminal pad 210 can be electrically connected to a neutral contact surface of the cap 192 as described above.

Mounting of the LED assembly 182 to the cap 192 is illustrated in FIG. 11C. As shown, the tail 204 extends along the channel 224, with the positive terminal pad 208 disposed against (or over) the positive contact surface 214 of the cap 192. An adhesive 228 can be employed to bond the tail 192 to the cap 192 in the region of the positive contact surface 214, thereby ensuring that the positive contact surface 214 is entirely covered by the substrate 186 (and thus electrically insulated). The bump 226 positions the neutral terminal pad 210 immediately adjacent the threaded surface 222 of the cap 192, and thus available for establishing an electrical connection to wiring of a conventional light socket. As a point of reference, FIG. 11C further reflects the non-conductive ring 218 electrically isolating the cap 192 from the heat sink body 34, as well as the fold line 206 between the base 200 and the tail 204 of the substrate 186. Finally, one of the optional fins 72 formed by the heat sink body 34 is identified.

Figure 12:
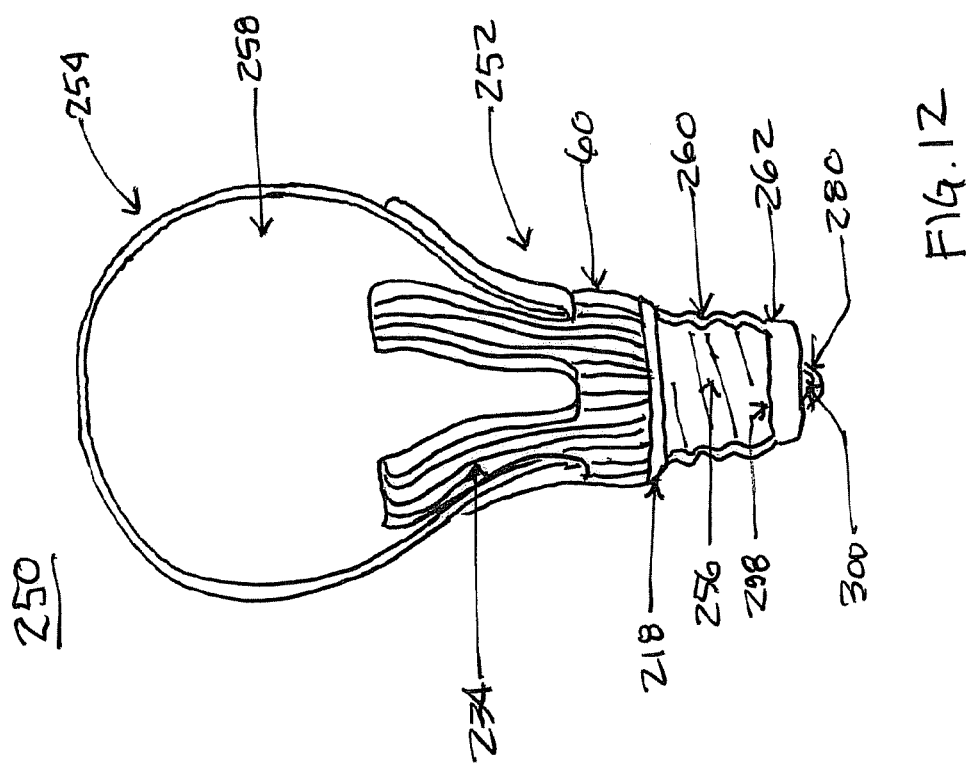
FIG. 12 is a side view of another LED light bulb device in accordance with principles of the present disclosure.

Yet another embodiment LED light bulb device 250 in accordance with principles of the present disclosure is shown in FIG. 12, and includes an LED assembly 252 and a light bulb-like structure 254. The LED light bulb device 250 is akin to the LED light bulb device 180 (FIG. 9) described above in that the LED assembly is mounted over an exterior of a cap 256 provided with the light bulb-light structure 254, and thus is more readily assembled by an end user, with the light bulb-like structure 254 optionally being an existing AC/Edison light bulb (functional or non-functioning) having a typical bulb body 258. With the configuration of FIG. 12, however, the LED assembly 252 may be more robustly mounted to the cap 256 without the provision of the optional channel 224 (FIG. 11A) described above.

Figure 13:
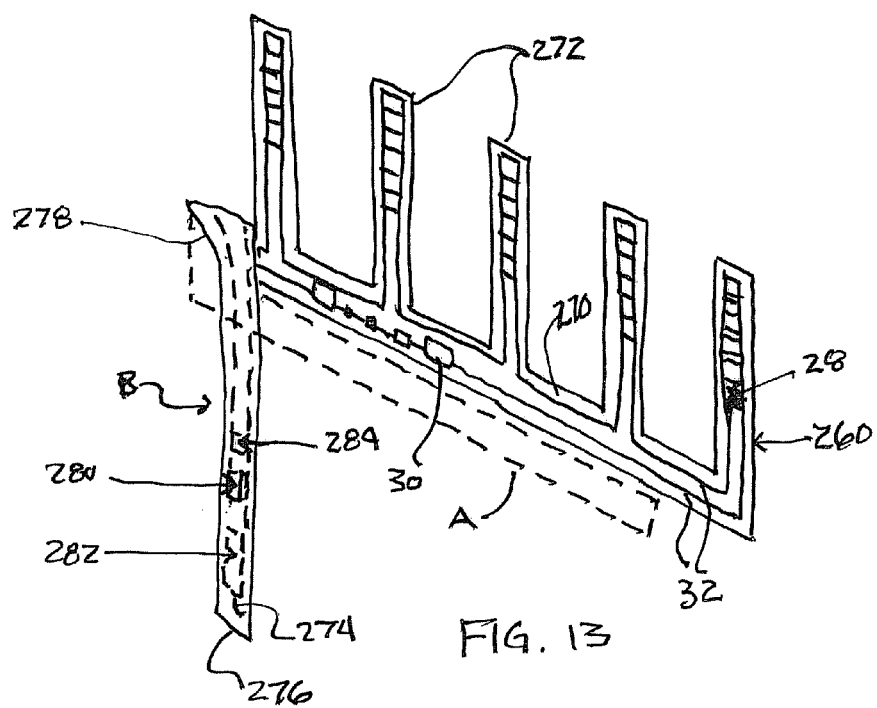
FIG. 13 is a perspective view of a flex circuit useful with the device of FIG. 12.

More particularly, the LED assembly 252 includes a substrate 260, the optional heat sink body 34, the optional non-conductive ring 218 and an optional case 262. The substrate 260 can be a flexible, non-conductive material, and maintains various other components described above and hidden in the view of FIG. 12 (e.g., the LEDs 28, the transformer circuitry 30, the connective circuitry 32). For example, FIG. 13 provides one example of the substrate 260 (as well as the LEDs 28 and circuitry 30, 32) in an initial state (e.g., prior to mounting to the light bulb-like structure 254). In some embodiments, the substrate 260 and the connective circuitry 32 is formed or provided as a flex circuit to which the LEDs 28 and the transformer circuitry 30 are mounted or formed. Regardless, the substrate forms or defines a base 270, a plurality of legs 272, and a tail 274. The legs 272 extend from the base 270 in a spaced apart fashion, with the LEDs 28 being disposed on each of the legs 272 in a set format as described above. The tail 274 extends from the base 270 apart from the legs 272, terminating at a tail end 276. The tail 274 can be foldable relative to the base 270 (due to the flexible nature of the substrate 260), for example along one or more fold lines 278 imparted into the substrate 260. As a point of reference, FIG. 13 depicts an initial, unfolded state of the tail 274 with dashed lines ("A" in FIG. 13), whereas the folded state is labeled as "B". The transformer circuitry 30 extends along the tail 274, terminating at a positive terminal pad 280 and a neutral terminal pad 282 (with the pads 280, 282 being electrically isolated from one another via the non-conductive substrate 260). It is further contemplated that one or all of the components of the transformer circuitry (e.g., chip sets apart from wiring of the transformer circuitry) can be applied to the tail 274, as indicated at 284 in FIG. 13.

With reference to FIGS. 12 and 14, the substrate 260, including the components carried thereby, can be mounted to the heat sink body 34 (where provided) in any of the manners described above, prior to mounting of the LED assembly 252 to the light bulb-like structure 254. As a point of reference, FIG. 14 illustrates the LED light device 250 mounted to a light fixture socket 286, and depicts the light bulb-like structure 254 as including the bulb body 258 affixed to the cap 256 via an adhesive 288 as is conventionally employed in some constructions contemplated by the present disclosure. Alternatively, the substrate 260, including the components carried thereby, can initially be mounted to the light bulb-like structure 254, followed by placement of the heat sink body 34 over the so-mounted substrate 260. Regardless, the base 270 extends about the bulb body 258 (e.g., about a bulb body foot 290 as shown in FIG. 14), with the legs 272 extending upwardly along an exterior of the bulb body 258 to position the LEDs 28 and the transformer circuitry 30 as shown. The tail 274 is folded to extend downwardly from the base 270, and extended about an exterior of the cap 256. As best shown in FIG. 14, the tail end 276 is located adjacent or above an upper end 292 of the cap 256, such that tail 274 effectively forms a saddle about the cap 256. With this arrangement, the tail 274 positions the positive terminal pad 280 at a positive contact surface 294 of the cap 256, and the neutral terminal pad 282 at a neutral contact surface 296 of the cap 256. Due to the flexible nature of the substrate 260, the tail 274 readily conforms to a surface of the cap 256 (e.g., any exterior threads). By forming the tail 274 to be of a size greater than a size of the positive contact surface 294 of the cap 256, upon final placement of the LED assembly 252, the tail 274 serves to electrically isolate or disable the cap 256, thereby preventing delivery of power to the cap 256 (and thus any other components, such as a filament (not shown) connected thereto).

The tail 274 can be connected to the cap 256 in a variety of fashions, for example via an adhesive. In some constructions, to enhance attachment between the tail 274 and the cap 256, as well as to better ensure complete coverage of the positive contact surface 294 of the cap 256, the optional case 262 can be provided. The case 262 is formed of an electrically non-conductive material (e.g., plastic) and is configured for assembly about the tail 274. For example, the case 262 can include upper and lower case portions 298, 300 that combine to form a slot 302 (best shown in FIG. 14) through which the tail 274 extends. The case portions 298, 300 can incorporate a snap-together feature (e.g., the upper case portion 298 forms a hole into which a post provided with the lower case portion 300 is frictionally received) for user assembly, or can be provided as an integrally formed body. Regardless, the lower case portion 300 forms an opening 304 (FIG. 14) at which the positive terminal pad 280 is accessible upon final assembly for completing an electrical connection with the socket 286 as described below.

The electrically non-conductive ring 218 (where provided) is applied over the cap 256, and positioned to electrically isolate the cap 256 from the heat sink body 34 (it being understood that in some embodiments, the non-conductive ring 218 is formed as an integral component of the heat sink body 34). In some constructions, the non-conductive ring 218 further serves to secure the tail end 276 relative to the light bulb-like structure.

During use, the LED light device 250 can be mounted (e.g., threaded) to the light fixture socket 286 as shown in FIG. 14. When fully inserted, the positive terminal pad 280 contacts (or is otherwise electrically connected to) a positive wiring contact 308 of the socket 286, and the neutral terminal pad 282 contacts (or is otherwise electrically connected to) a neutral (or negative) wiring contact 310 of the socket 286. When electrical energy is delivered to the socket 286, the LED light device 250 operates to power the LEDs 28 to illuminate the surrounding environment (e.g., via the outside-in, double diffusion light direction described above).

Figure 15A:
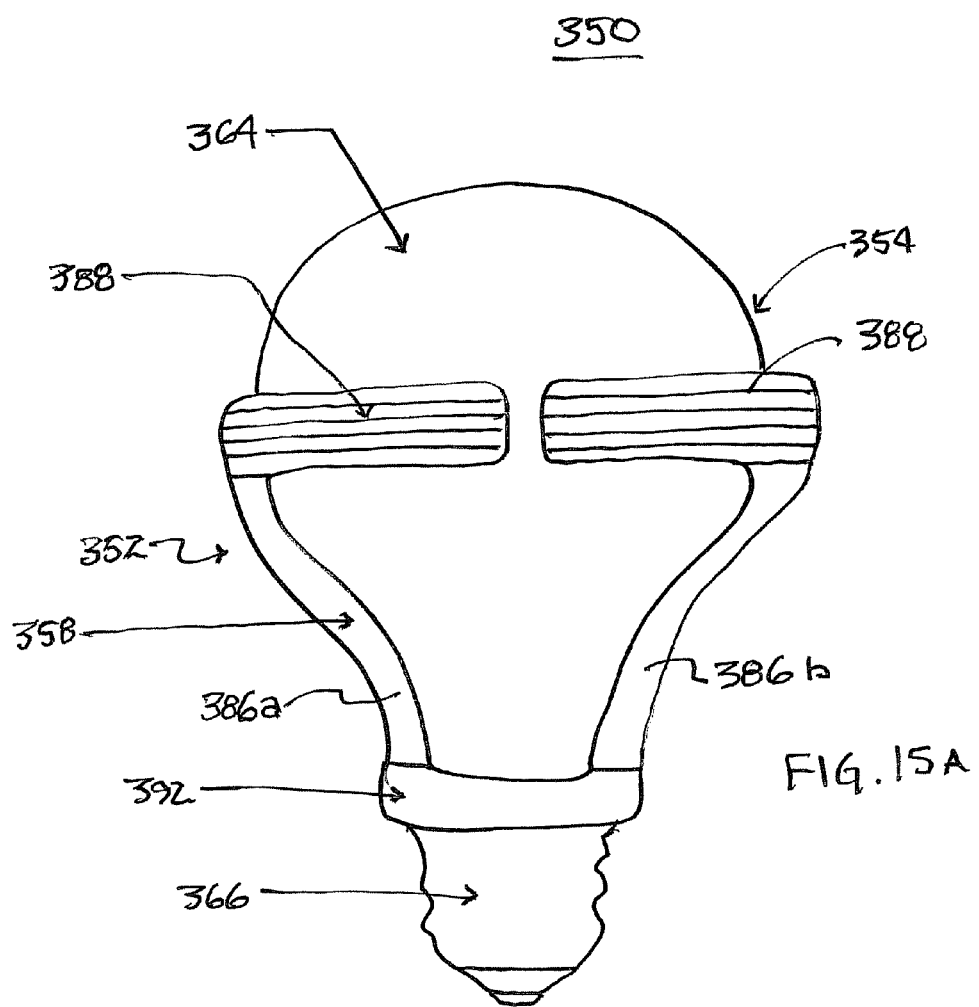
FIG. 15A is a side view of another LED light bulb device in accordance with principles of the present disclosure.
Figure 15B:
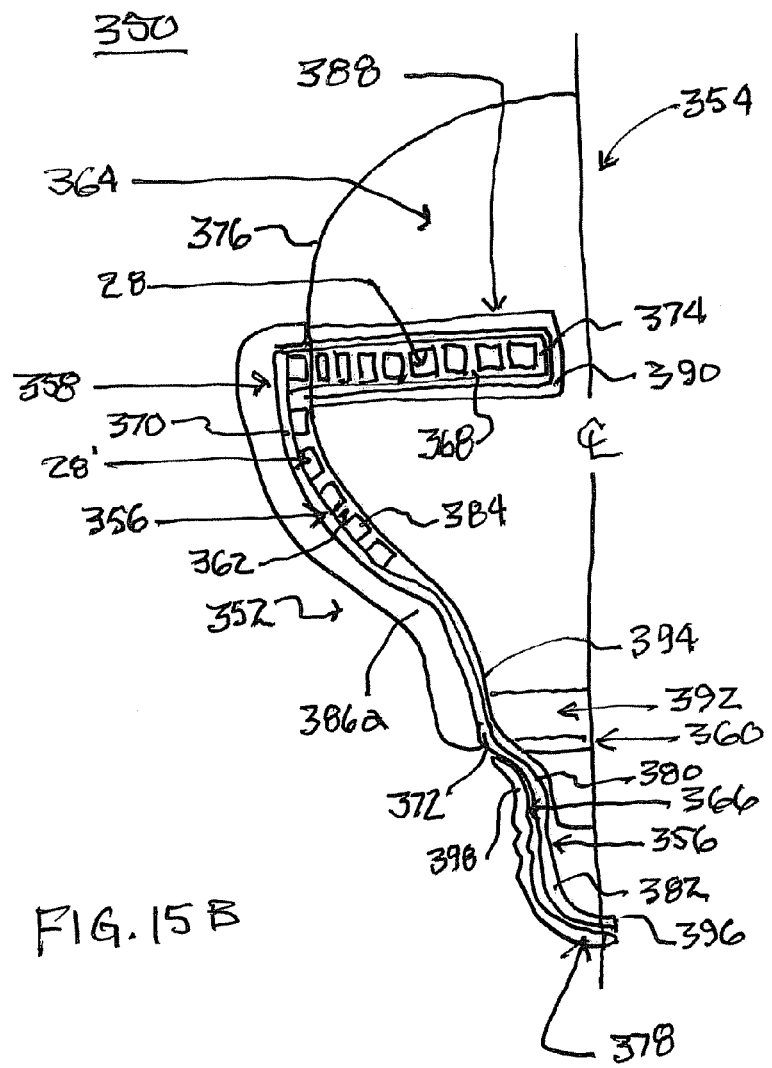
FIG. 15B is a cross-sectional view of a portion of the device of FIG. 15A.

Another embodiment LED light bulb device 350 in accordance with principles of the present disclosure is shown in FIGS. 15A and 15B, and generally includes an LED assembly 352 and a light bulb-like structure 354. The LED assembly 352 is akin to previous embodiments, and includes a substrate 356, the LEDs 28, an optional heat sink body 358, and an optional non-conductive ring 360. The substrate 356 forms or maintains connective circuitry (not shown) as described above, as well as transformer circuitry 362 (referenced generally) and the LEDs 28. The LED assembly 352 is mounted to the light bulb-like structure 354 as described below, that otherwise includes a bulb body 364 and a cap 366. Unlike previous embodiments, the LED assembly 352 arranges at least a set 368 of closely positioned LEDs 28 partially about a circumference of the bulb body 364.

More particularly, and with specific reference to FIG. 15B, the substrate 356 includes opposing legs 370 (one of which is shown in FIG. 15B) extending from a base 372 (referenced generally), with a pair of fingers 374 (one of which is shown in FIG. 15B) extending from each leg 370 opposite the base 372. Each of the fingers 374 maintains a set or series of the LEDs 28 (e.g., the finger 374 in FIG. 15B includes the first set 368 of LEDs 28). When assembled to the bulb body 364 (e.g., at an exterior surface 376 thereof), the legs 370 each extend upwardly (relative to the orientation of FIG. 15B) along the bulb body 364 at opposite sides thereof; the fingers 374, in turn, extend at an approximately ninety degree angle relative to the corresponding leg 370 (in some embodiments) and thus are arranged circumferentially relative to the bulb body 364. As generally reflected in FIG. 15A, then, the fingers 374 (hidden in FIG. 15A) combine to define a nearly continuous, circular arrangement of the LEDs 28 (hidden in FIG. 15A) about a circumference of the bulb body 364. Returning to FIG. 15B, one or more additional LEDs 28' can be provided along one or both of the legs 370.

The transformer circuitry 362 can take any of the forms described above, and includes positive and neutral terminal pads 378, 380 along a tail 382 of the substrate 356. In some optional embodiments, one or more of the transformer circuitry components can be located along one or both to the legs 370, as indicated at 384 in FIG. 15B.

With reference to FIGS. 15A and 15B, the heat sink body 358, where provided, can assume various forms that retain the substrate 356, and the components maintained thereby, relative to the bulb body 364, and provides heat dissipation from the LEDs 28, 28' (and optionally the transformer circuitry 362). For example, the heat sink body 358 can include or form opposing stems 386a, 386b that surround respective ones of the legs 370. An opposing pair of neck segments 388 extend from each of the stems 386a, 386b, commensurate (e.g., slightly larger than) in size and shape with respective ones of the fingers 374 (it being understood that in the view of FIG. 15A, one of the neck segments 388 is visible for each of the stems 386a, 386b). As with previous embodiments, the stems 386a, 386b (as well as the neck segments 388) are sized to receive the corresponding portion of the substrate 356 and any components maintained thereby (e.g., the LEDs 28, 28'), and provide an inner edge 390 (referenced generally in FIG. 15B) that bears against, and can be adhered to, the exterior surface 376 of the bulb body 364. Thus, the heat sink body 358 can, upon final assembly, serve to encase the LEDs 28, 28' relative to the bulb body 358, protecting the LEDs 28, 28' from external contaminants (e.g., dust). Finally, the heat sink body 358 can include a support ring 392 that promotes more robust affixment of the heat sink body 358 to the light bulb-like structure 354.

Manufacture of the LED light device 350 can include arrangement of the tail 382 along an interior of the cap 366 as shown in FIG. 15B. With this approach, the tail 382 extends between the cap 366 and a foot 394 of the bulb body 364. Alternatively, the tail 382 can be arranged along an exterior of the cap 366 as with several previous embodiments described above (e.g., where an end user applies the LED assembly 352 to the light bulb-like structure 354). Regardless, the positive terminal pad 378 is electrically connected to a positive contact surface 396 of the cap 366, whereas the neutral terminal pad 380 is electrically connected to a neutral (or negative) contact surface 398. Where provided, the heat sink body 358 retains the substrate 356 (and the components, such as the LEDs 28, 28', maintained thereby) to the arrangement as shown; alternatively, the substrate 356 can be directly adhered (or otherwise affixed) to the light bulb-like structure 354. In instances where the support ring 392 of the heat sink body 358 is formed of an electrically conductive material, the optional non-conductive ring 360 can be assembled over the cap 366 to electrically isolate the heat sink body 358 and the cap 366.

During use, the LED light device 350 operates in a manner similar to previous embodiments whereby power delivered to the LED light device 350 is transformed to DC power and delivered to the LEDs 28, 28'. In response, the LEDs 28, 28' emit light, with the one arrangement of FIGS. 15A and 15B providing an outside-in light direction. Alternatively, the LEDs 28, 28' can be positioned to emit light directly outwardly relative to the bulb body 364.

Another embodiment LED light bulb device 450 is shown in FIG. 16, and again includes an LED assembly 452 and a light bulb-like structure 454. The LED assembly 452 is akin to previous embodiments, and includes a substrate 456, the LEDs 28, an optional heat sink body 458, and a column 460. The substrate 456 forms or maintains connective circuitry (not shown) as described above, as well as transformer circuitry 462 (referenced generally) and the LEDs 28. The LED assembly 452 is mounted to the light bulb-like structure 454 as described below, that otherwise includes a bulb body 464 and a cap 466. The column 460 serves as an electrical connection conduit through an interior of the bulb body 464 to a top 468 thereof, promoting arrangement of the LEDs 28 in closer proximity to the top 468.

Figure 17A:
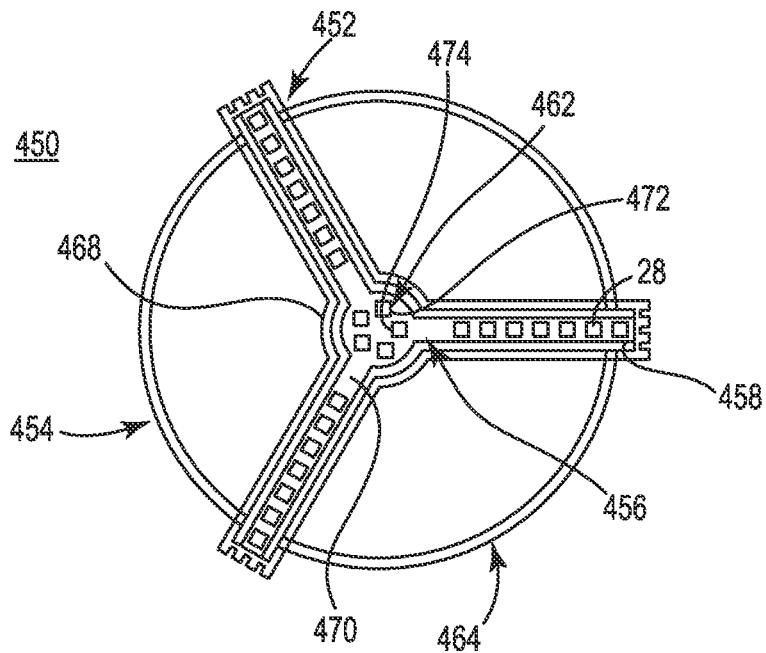
FIG. 17A is a top cross-sectional view of the device of FIG. 16.

As shown in FIG. 17A, the substrate 456 includes legs 470 each maintaining a set of the LEDs 28. In some constructions, three of the legs 470 are provided, although any other number, greater or lesser, is also acceptable. The legs 470 extend from a common base 472, with the transformer circuitry 462 being maintained or formed on the base 472, and including transformer components 474 appropriate for the selected format of the LEDs 28. The connective circuitry (not shown) is formed along the substrate 456, and establishes an electrical connection between the LEDs 28 and the transformer circuitry 462.

Figure 17B:
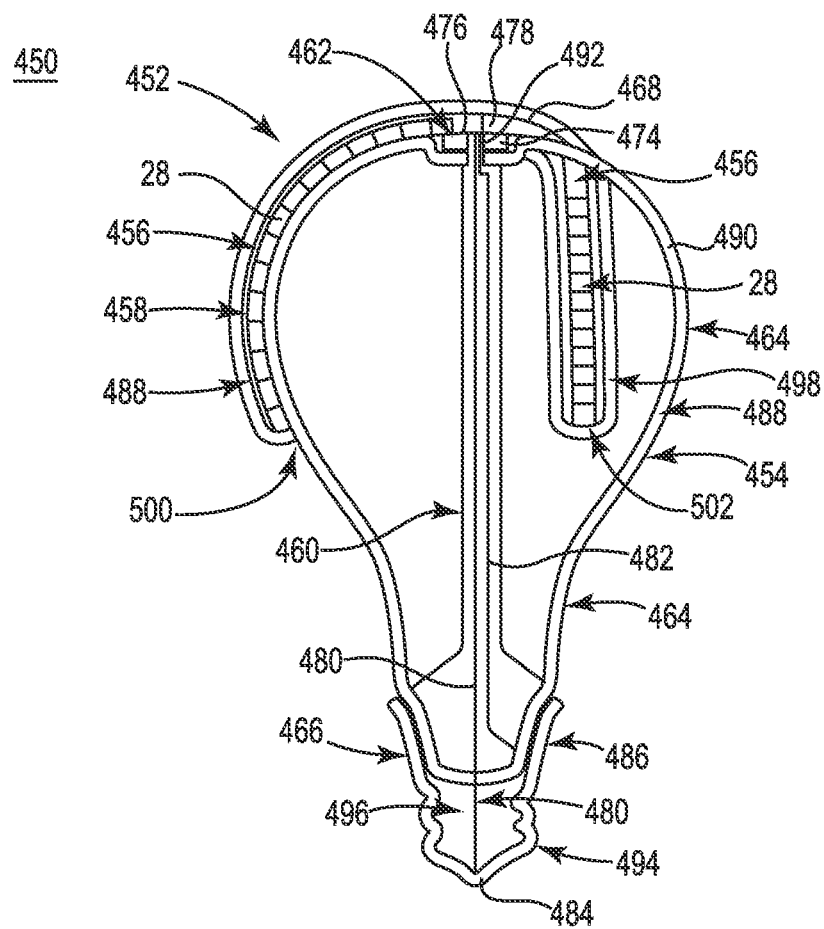
FIG. 17B is a side cross-sectional view of the device of FIG. 16.

Positive and neutral terminal pads 476, 478 provided with the transformer circuitry 462 are shown in FIG. 17B, and are maintained by the base 472. Electrically insulated wires 480, 482 extend from the positive and neutral terminal pads 476, 478, respectively, within an interior of the column 460. In this regard, the column 460 can be an integrally formed component of the bulb body 464, or can be separately formed and assembled thereto. Regardless, the wire 480 from the positive terminal pad 476 is electrically connected to a positive contact surface 484 of the cap 466, and the wire 482 from the neutral terminal pad 478 is electrically connected to a neutral (or negative) contact surface 486 of the cap 466.

In addition to optionally forming the column 460, the bulb body 464 includes an outer wall 488 defining an exterior surface 490, as well as a cavity 492 at the bulb top 468. The cavity 492 is sized to receive the transformer components 474, and is open to the column 460 to permit passage of the wires 480, 482.

The cap 466 can have any of the forms described above, and is generally configured for selective engagement with a corresponding light socket (e.g., threaded exterior surface, prongs, etc.). With the one possible configuration of FIG. 17B, the cap 466 includes an isolator ring 494 that electrically isolates the positive and neutral contact surfaces 484, 486. Further, FIG. 17B reflects that an adhesive 496 can be conventionally employed to affix the bulb body 464 and the cap 466.

Figure 16:
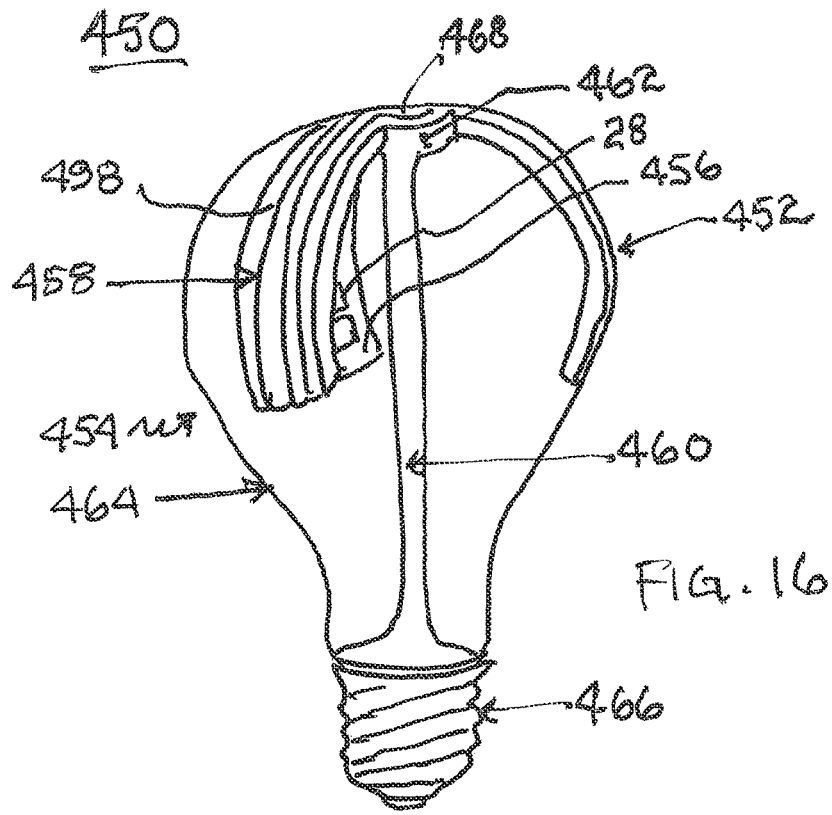
FIG. 16 is a side view of another LED light bulb device in accordance with principles of the present disclosure.

With reference to FIGS. 16 and 17B, the heat sink body 458, where provided, includes stems 498 commensurate with the legs 470 such that upon final assembly, one of the stems 498 encompasses a respective one of the legs 470 (and the LEDs 28 carried thereby) as with previous embodiments. In some embodiments, the stems 498 project outwardly beyond the exterior surface 490 of the bulb body 464; alternatively, the bulb body 464 can form slots within which the stems 498 are nested. Regardless, an adhesive or sealant 500 can be employed to robustly adhere and/or seal an inner surface 502 of the stems 498 to the exterior surface 490 in a manner that inhibits passage of dust or other contaminants into contact with the contained LEDs 28.

Figure 18A:
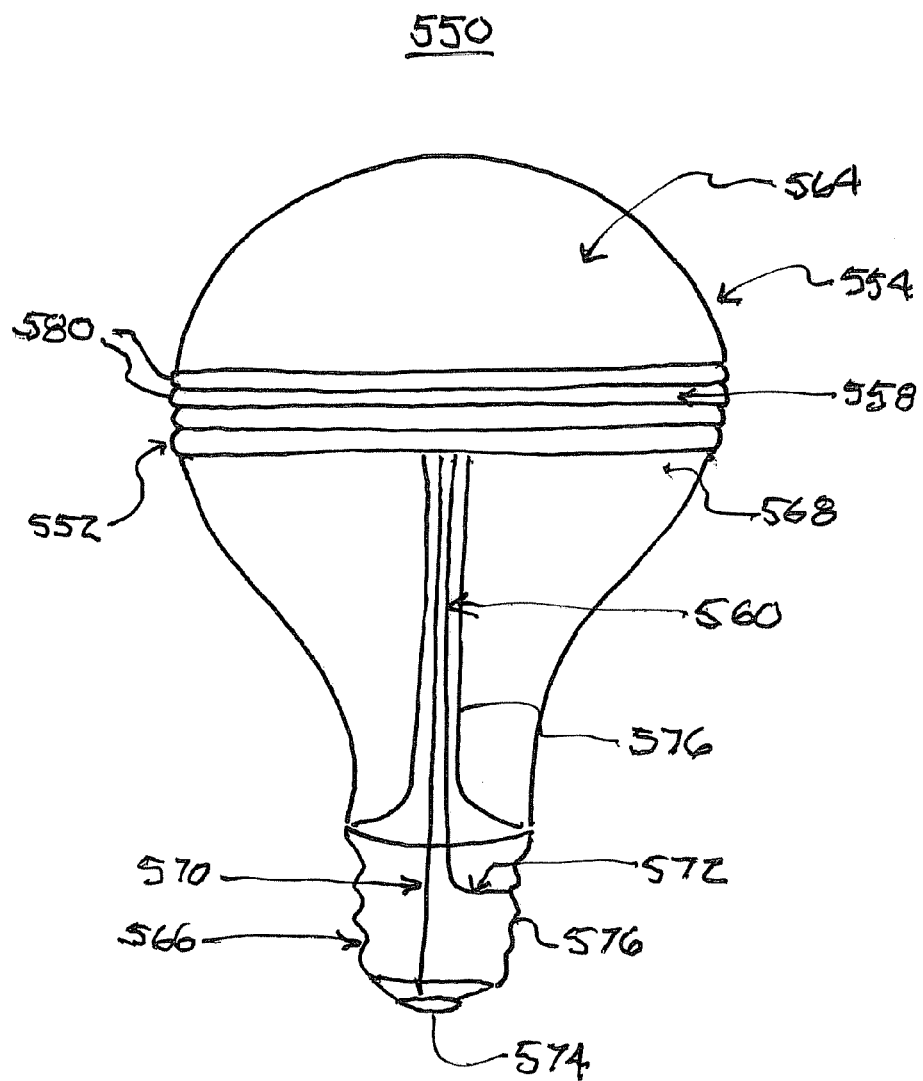
FIG. 18A is a side view of another LED light bulb device in accordance with principles of the present disclosure.
Figure 18B:
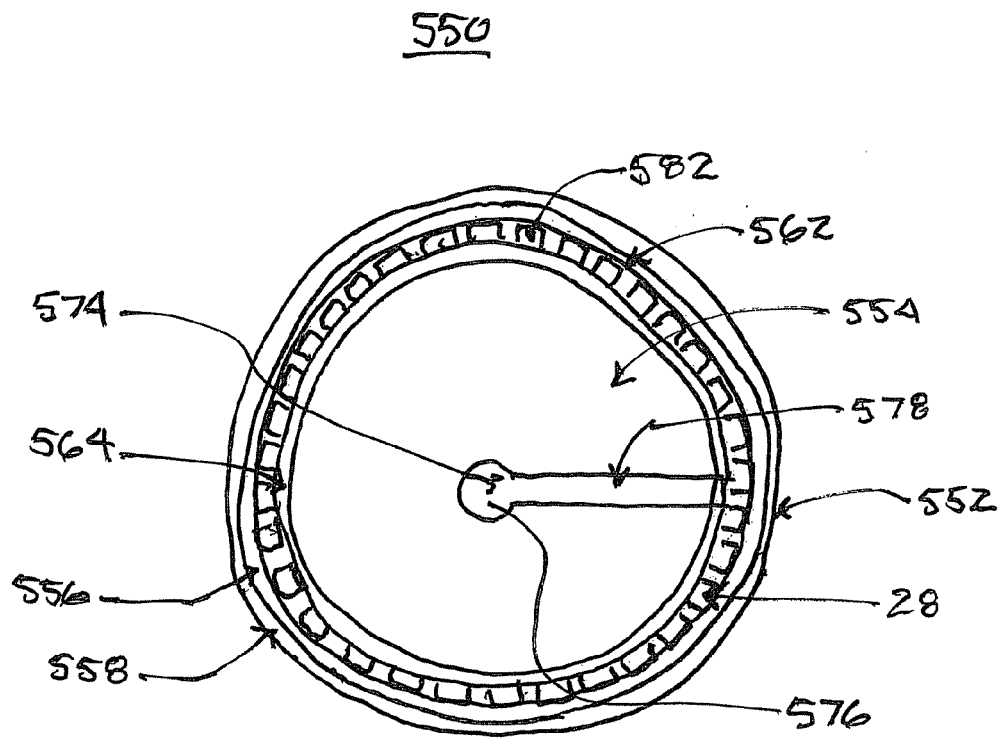
FIG. 18B is a top cross-sectional view of the device of FIG. 18A.

Another embodiment LED light bulb device 550 is shown in FIGS. 18A and 18B, and generally includes an LED assembly 552 and a light bulb-like structure 554. The LED light device 550 is akin to the LED light device 450 (FIG. 16) described above, with the LED assembly 552 including a substrate 556, the LEDs 28, an optional heat sink body 558, and a column 560. The substrate 556 forms or maintains connective circuitry (not shown) as described above, as well as transformer circuitry 562 (referenced generally) and the LEDs 28. The LED assembly 552 is mounted to the light bulb-like structure 554 as described below, that otherwise includes a bulb body 564 and a cap 566. The column 560 serves as an electrical connection conduit through an interior of the bulb body 564 to a mid-section 568 thereof, promoting arrangement of the LEDs 28 about a circumference of the bulb body 564.

Though hidden in the views of FIGS. 18A and 18B, the transformer circuitry 562 includes positive and neutral terminal pads from which insulated wires 570, 572 extend, respectively. The wire 570 from the positive terminal pad is electrically connected to a positive contact surface 574 of the cap 566, whereas the wire 572 from the neutral terminal pad is electrically connected to a neutral contact surface 576. In this regard, the wires 570, 572 extend through the column 560 that is otherwise formed by or within an interior of the bulb body 564. In this regard, the column 560 can include a vertical section 576 and a horizontal section 578 that combine to define a pathway from the middle region 568 of the bulb body 564 to an interior of the cap 566.

Upon final assembly, the LEDs 28 are arranged along an exterior surface 574 of the bulb body 564, positioned to inwardly direct emitted light relative to the bulb body 564. Alternatively, the LEDs 28 can be arranged to direct emitted light outwardly and/or can be assembled to an interior of the bulb body 564. Where provided, the heat sink body 558 encompasses the substrate 556 at least in a region directly adjacent the LEDs 28 to promote dissipation of heat (e.g., via fins 580). Along these same lines, one or more transformer components 582 can be mounted to the substrate 556 in a region of the LEDs 28 as shown, with the heat sink body 558 further serving to dissipate heat from the component(s) 582.

The LED light bulb device of the present disclosure provides a marked improvement over previous designs. The LED assembly can be assembled to a light bulb-like structure by a manufacturer, or embodiments are provided that promote final construction by an end user. Further, the optional double diffusion of LED emitted light associate with some of the described embodiments can enhance consumer acceptance.

Although the present disclosure has been described with reference to preferred embodiments, workers skilled in the art will recognize that changes can be made in form and detail without departing from the spirit and scope of the present disclosure.

What is claimed is:
1. An LED light bulb device comprising:
a bulb body defining an exterior of the LED light bulb device and an open interior region, wherein the bulb body defines a shape having a circumference;

a first elongated heat sink stem extending along the bulb body and open to the exterior;

a second elongated heat sink stem extending along the bulb body and open to the exterior;

wherein the first and second heat sink stems are discrete from one another and are circumferentially spaced from one another along the circumference of the bulb body;

a first plurality of LEDs directly supported by the first heat sink stem;

a second plurality of LEDs directly supported by the second heat sink stem;

wherein light from the first and second plurality of LEDs is directed inwardly into the interior region and then outwardly from the interior region.

2. The LED light bulb of claim 1, wherein the first and second heat sink stems are metal.

3. The LED light bulb of claim 1, further comprising a cap affixed to the bulb body.

4. The LED light bulb of claim 3, wherein the cap forms a threaded exterior surface configured to threadably engage a light socket.

5. The LED light bulb of claim 1, wherein the first and second plurality of LEDs are sealed relative to the exterior.

6. The LED light bulb of claim 1, wherein each of the first and second elongated heat sink stems is a continuous body.

7. The LED light bulb of claim 1, further comprising:

a third elongated heat sink stem extending along the bulb body and open to the exterior;

wherein the third heat sink stem is discrete from the first and second heat sink stems and is circumferentially spaced from the first and second heat sink stems along the circumference of the bulb body; and a third plurality of LEDs directly supported by the third heat sink stem;

wherein the LED light bulb is configured such that the light emitted from at least one LED of the third plurality of LEDs is emitted outwardly to the exterior between the first and second heat sink stems.

8. The LED light bulb of claim 1, wherein relative to an axial centerline of the LED light bulb device, the shape includes:

a lower portion having an increasing diameter from a lower end;

an upper portion having a decreasing diameter in extension from the lower portion to an upper end opposite the lower end.

* * * * *